US011978308B2

(12) United States Patent
Acres

(10) Patent No.: US 11,978,308 B2
(45) Date of Patent: May 7, 2024

(54) COMMUNICATING INFORMATION ABOUT NETWORKED GAMING MACHINES TO PROSPECTIVE PLAYERS

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 0 days.

(21) Appl. No.: 18/309,401

(22) Filed: Apr. 28, 2023

(65) Prior Publication Data

US 2024/0029507 A1 Jan. 25, 2024

Related U.S. Application Data

(63) Continuation of application No. 17/752,469, filed on May 24, 2022, now Pat. No. 11,676,449, which is a (Continued)

(51) Int. Cl.
*G07F 17/32* (2006.01)
*G07F 17/34* (2006.01)

(52) U.S. Cl.
CPC ........ *G07F 17/323* (2013.01); *G07F 17/3213* (2013.01); *G07F 17/3234* (2013.01); *G07F 17/3237* (2013.01); *G07F 17/3239* (2013.01); *G07F 17/3251* (2013.01); *G07F 17/3258* (2013.01); *G07F 17/3269* (2013.01); *G07F 17/3272* (2013.01); *G07F 17/3288* (2013.01); *G07F 17/3293* (2013.01); *G07F 17/34* (2013.01)

(58) Field of Classification Search
CPC ............... G07F 17/323; G07F 17/3213; G07F 17/3234; G07F 17/3237; G07F 17/3239; G07F 17/3251; G07F 17/3258; G07F 17/3269; G07F 17/3272; G07F 17/3288; G07F 17/3293; G07F 17/34
USPC ........................................................... 463/16
See application file for complete search history.

(56) References Cited

U.S. PATENT DOCUMENTS 5,023,965 A 6/1991 Reichel
5,111,391 A 5/1992 Fields et al.
(Continued)

FOREIGN PATENT DOCUMENTS

EP 0443738 A2 8/1991
EP 0896305 A2 2/1999
(Continued)

OTHER PUBLICATIONS

Bally Command Center Brochure, Ballys Technologies 2009.
(Continued)

*Primary Examiner* — Allen Chan
(74) *Attorney, Agent, or Firm* — Ballard Spahr LLP

(57) ABSTRACT

On a network of electronic gaming machines, data regarding the performance of the machines or the players of the machines is collected and processed to make predictions of future jackpots and recommendations of games to play. The predictions and recommendations are delivered via at least one virtual persona that communicates with players or potential players via displays in a casino or on a web browser, via smartphone. Players can conduct conversations with the persona using cellular telephone, text messaging, or other types of Internet communications.

20 Claims, 24 Drawing Sheets

Related U.S. Application Data continuation of application No. 17/069,984, filed on Oct. 14, 2020, now Pat. No. 11,373,477, which is a continuation of application No. 16/261,705, filed on Jan. 30, 2019, now Pat. No. 10,832,518, which is a continuation of application No. 15/950,396, filed on Apr. 11, 2018, now Pat. No. 10,229,554, which is a continuation of application No. 15/471,804, filed on Mar. 28, 2017, now Pat. No. 9,972,167, which is a continuation of application No. 15/271,615, filed on Sep. 21, 2016, now Pat. No. 9,640,030, which is a continuation of application No. 14/935,674, filed on Nov. 9, 2015, now Pat. No. 9,472,052, which is a continuation of application No. 13/445,355, filed on Apr. 12, 2012, now Pat. No. 9,224,260.

(56) References Cited

U.S. PATENT DOCUMENTS

| | | | |
|---|---|---|---|
| 5,113,492 | A | 5/1992 | Ariki et al. |
| 5,127,651 | A | 7/1992 | Okada |
| 5,146,273 | A | 9/1992 | Yamada |
| 5,174,234 | A | 12/1992 | Ryan |
| 5,217,447 | A | 6/1993 | Gagnon |
| 5,227,970 | A | 7/1993 | Harris |
| 5,699,124 | A | 12/1997 | Nuber et al. |
| 5,830,065 | A | 11/1998 | Sitrick |
| 5,857,909 | A | 1/1999 | Rubin |
| 5,970,143 | A | 10/1999 | Schneier et al. |
| 6,319,122 | B1 | 11/2001 | Packes, Jr. et al. |
| 6,454,651 | B1 | 9/2002 | Yoseloff |
| 6,728,679 | B1 | 4/2004 | Strubbe et al. |
| 6,800,027 | B2 | 10/2004 | Giobbi et al. |
| 6,932,702 | B1 | 8/2005 | Harris |
| 7,105,736 | B2 | 9/2006 | Laakso |
| 7,327,217 | B2 | 2/2008 | Carter et al. |
| 7,361,088 | B2 | 4/2008 | Maya et al. |
| 7,729,946 | B2 | 6/2010 | Chu |
| 7,753,789 | B2 | 7/2010 | Walker et al. |
| 7,957,565 | B1 | 6/2011 | Sharma et al. |
| 8,388,438 | B2 | 3/2013 | Englman et al. |
| 8,568,218 | B2 | 10/2013 | Kelly et al. |
| 2001/0024971 | A1 | 9/2001 | Brossard |
| 2002/0046102 | A1 | 4/2002 | Dohring et al. |
| 2002/0132666 | A1 | 9/2002 | Lind et al. |
| 2002/0152120 | A1 | 10/2002 | Howington |
| 2002/0161882 | A1 | 10/2002 | Chatani |
| 2003/0003997 | A1 | 1/2003 | Vuong et al. |
| 2003/0013527 | A1 | 1/2003 | Rowe et al. |
| 2003/0054878 | A1 | 3/2003 | Benoy et al. |
| 2003/0069074 | A1 | 4/2003 | Jackson |
| 2003/0114217 | A1 | 6/2003 | Walker et al. |
| 2003/0195031 | A1 | 10/2003 | O'Donovan et al. |
| 2003/0220139 | A1 | 11/2003 | Peterson |
| 2004/0018478 | A1 | 1/2004 | Styles |
| 2004/0024608 | A1 | 2/2004 | Saenz et al. |
| 2004/0091848 | A1 | 5/2004 | Nemitz |
| 2004/0127290 | A1 | 7/2004 | Walker et al. |
| 2004/0147300 | A1 | 7/2004 | Seelig et al. |
| 2005/0051021 | A1 | 3/2005 | Laakso |
| 2005/0125244 | A1 | 6/2005 | Schneider |
| 2005/0181873 | A1 | 8/2005 | Bond |
| 2006/0053035 | A1 | 3/2006 | Eisenberg |
| 2006/0128463 | A1 | 6/2006 | Okada |
| 2006/0154720 | A1 | 7/2006 | Okuniewicz |
| 2006/0172792 | A1 | 8/2006 | Vancura |
| 2007/0054738 | A1 | 3/2007 | Muir |
| 2007/0087797 | A1 | 4/2007 | Van Luchene |
| 2007/0087834 | A1 | 4/2007 | Moser et al. |
| 2007/0117608 | A1 | 5/2007 | Roper et al. |
| 2007/0135202 | A1 | 6/2007 | Linard et al. |
| 2007/0174809 | A1 | 7/2007 | Brown et al. |
| 2007/0178909 | A1 | 8/2007 | Doyle |
| 2007/0180389 | A1 | 8/2007 | Holm et al. |
| 2007/0225076 | A1 | 9/2007 | Aida |
| 2008/0004996 | A1 | 1/2008 | Kuehling |
| 2008/0020788 | A1 | 1/2008 | Griswold et al. |
| 2008/0020845 | A1 | 1/2008 | Low et al. |
| 2008/0045288 | A1 | 2/2008 | Moshal et al. |
| 2008/0076529 | A1 | 3/2008 | Richards et al. |
| 2008/0086325 | A1 | 4/2008 | James |
| 2008/0090645 | A1 | 4/2008 | Walker et al. |
| 2008/0183678 | A1 | 7/2008 | Weston et al. |
| 2008/0268953 | A1 | 10/2008 | Acres |
| 2008/0280684 | A1 | 11/2008 | McBride et al. |
| 2008/0311979 | A1 | 12/2008 | Walker et al. |
| 2009/0170608 | A1 | 7/2009 | Herrmann et al. |
| 2009/0234712 | A1 | 9/2009 | Kolawa et al. |
| 2009/0239667 | A1 | 9/2009 | Rowe et al. |
| 2009/0284348 | A1 | 11/2009 | Pfeffer |
| 2009/0291762 | A1 | 11/2009 | Walker |
| 2010/0029382 | A1 | 2/2010 | Cao |
| 2010/0093434 | A1 | 4/2010 | Rivas |
| 2010/0121808 | A1 | 5/2010 | Kuhn |
| 2010/0125789 | A1 | 5/2010 | Burke et al. |
| 2010/0188936 | A1 | 7/2010 | Beppu et al. |
| 2010/0298040 | A1 | 11/2010 | Joshi et al. |
| 2010/0323785 | A1 | 12/2010 | Motyl et al. |
| 2011/0071880 | A1 | 3/2011 | Spector |
| 2011/0183732 | A1 | 7/2011 | Block et al. |
| 2011/0205068 | A1 | 8/2011 | Huynh et al. |
| 2011/0289064 | A1 | 11/2011 | Lebeau et al. |
| 2012/0094756 | A1 | 4/2012 | Griswold et al. |
| 2012/0150578 | A1 | 6/2012 | Mangat et al. |
| 2013/0217508 | A1 | 8/2013 | Golden |
| 2013/0303274 | A1 | 11/2013 | Gadher et al. |
| 2014/0135125 | A1 | 5/2014 | Acres |
| 2014/0187332 | A1 | 7/2014 | Mickelsen et al. |
| 2016/0093158 | A1 | 3/2016 | Acres |
| 2016/0335840 | A1 | 11/2016 | Acres |
| 2017/0200341 | A1 | 7/2017 | Acres |
| 2017/0270741 | A1 | 9/2017 | Acres |
| 2018/0232988 | A1 | 8/2018 | Acres |
| 2018/0308309 | A1 | 10/2018 | Acres |
| 2019/0046879 | A1 | 2/2019 | Halper et al. |
| 2019/0156615 | A1 | 5/2019 | Acres |
| 2020/0265670 | A1 | 8/2020 | Acres |

FOREIGN PATENT DOCUMENTS

| | | | |
|---|---|---|---|
| GB | 2354179 | A | 3/2001 |
| GB | 2408949 | A | 6/2005 |
| JP | 5343738 | B2 | 11/2013 |
| WO | 2002032517 | A2 | 4/2002 |

OTHER PUBLICATIONS

Bally Technologies, "RCT Online, Daily News, Bally Technologies provides Foxwoods with new slots," 2011, 1 page.
Casino City Press, "Chops & Assoc. Live Animation," Nov. 11, 2011, 1 page.
Factiva, Inc., "Nortel Networks Ltd—Solutions Enhance Competitive Edge of Hospitality Sector in Caribbean and Latin America," May 17, 2006, 3 pages.
Factivia, Inc., Resort and Casino Companies: Great Wolf Lodge—Pocono Mountains Unveils Great Wolfe Story Explorers-, 2011, 2 pages.
Gamett, O., "An Introduction to skills-based routing and its operational complexities", Service Engineering 2000.
HS Backoffice UI Design part 2, cargocollective webpages, Mar. 2012 tittp://yanays.com/79633/728672/-portfolio/-chs-boffice.
HS Backoffice UI Design, cargocollective webpages, Mar. 2012 tittp://cargocollective.com/yaays#CHS-BackOffice.
Kue et al, "A fuzzy mathematics based optimal delivery scheduling approach", Computers in Industry 45, 245-259 2001.
Montana, Genetic Algorithms for Complex, Real-Time Scheduling, International Conference on Systems, Man and Cybernetics, 1998 http://citeseerx ist.psu.edu/viewdoc/summary?doi=10.t 1.130.3277.
Mops & Assoc. Live Animation, CasinoVendors/com, http://www.casinovendors.com/vendor/shops-assoc-live-animation, downloaded Nov. 11, 2011, 1 page.

(56) References Cited

OTHER PUBLICATIONS

Reateguia, E. et al. Personalization in an Interactive Environment through a Virtual Character, Computers & Education vol. 51, Issue 2, Sep. 2008, abstract, 1 page.
SDS line testing with the 19C Scopemeter test tool, fluke webpages, Feb. 2012 ittp://support.fluke.comifind-sales/downloadiasset/2444901_a_w.pdf.

FIG. 11
114
MADAME
FORTUNA
F O R T U N A
MADAME FORTUNA
TOTAL PAYOUT FROM YESTERDAY'S
GAME SUGGESTIONS:
$12,215.75

FIG. 13
114
A BRAND NEW
JACKPOT
WINNER!
$4500 Triple Diamond
YOU CAN BE NEXT!

COMMUNICATING INFORMATION ABOUT NETWORKED GAMING MACHINES TO PROSPECTIVE PLAYERS

CROSS REFERENCE TO RELATED APPLICATION

This application is a continuation of U.S. patent application Ser. No. 17/752,469, filed May 24, 2022, which is a continuation of U.S. patent application Ser. No. 17/069,984, filed Oct. 14, 2020, now U.S. Pat. No. 11,373,477 issued Jun. 28, 2022, which is a continuation of U.S. patent application Ser. No. 16/261,705, filed Jan. 30, 2019, now U.S. Pat. No. 10,832,518 issued Nov. 10, 2020, which is a continuation of U.S. patent application Ser. No. 15/950,396, filed Apr. 11, 2018, now U.S. Pat. No. 10,229,554 issued Mar. 12, 2019, which is a continuation of U.S. patent application Ser. No. 15/471,804 filed Mar. 28, 2017, now U.S. Pat. No. 9,972,167, issued May 15, 2018, which is a continuation of U.S. patent application Ser. No. 15/271,615 filed Sep. 21, 2016, now U.S. Pat. No. 9,640,030, issued on May 2, 2017, which is a continuation of U.S. patent application Ser. No. 14/935,674, filed Nov. 9, 2015, now U.S. Pat. No. 9,472,052, issued on Oct. 18, 2016. which is a divisional of, and claims priority to U.S. patent application Ser. No. 13/445,355, filed on Apr. 12, 2012, now U.S. Pat. No. 9,224,260, issued on Dec. 29, 2015, which is incorporated herein in its entirety.

FIELD OF THE INVENTION

This disclosure relates generally to methods and apparatus for communicating information about networked gaming machines to players and prospective players and more particularly to such methods and apparatus that are automated.

BACKGROUND

In many situations in life people find themselves in need of information, advice, or an opinion about a decision. After a decision is made and acted upon, many people find it satisfying to feel affirmed, and this is true regardless of the outcome. For example, if the outcome of the action is not as good as hoped, an empathetic response can be affirming. And of course if there is a successful outcome, some celebration and sympathetic joy is affirming. One such situation is a decision to purchase goods or services that arises from a need or desire on the part of the prospective purchaser. This need or desire may arise spontaneously or it may be a result of marketing or advertising directed to a specific product or service. Another such situation is gaming. Much of the fun of gaming is anticipation of successful outcomes that result from making decisions according to the rules of the game. And this is true regardless of whether the gaming is for fun, for a fee, or based on a wager that might produce an award.

One type of familiar game is a television game show. Although there is variety from show to show, there are themes common to virtually all such shows. One common aspect is the game show host. Most hosts excel at creating hope on the part of each contestant and affirming each in a manner appropriate to the results of his or her play. Of course the host guides and directs game play but generating hope and affirming player actions is an equally significant role for the host.

In gaming, especially where wagering is involved, and in purchasing goods and services, most people left to their own feel that they are in a somewhat adversarial role with the casino or seller, respectively. Most people who wager understand that the house has to take a cut of the total of all amounts wagered to stay in business and that the games are designed to generate that casino profit. In short, over time and on average, the players win less than they wager.

In connection with the purchase of goods or services, some sellers are more quality conscious or more ethical than others. This creates a market where some ostensibly equivalent purchases have more value than others. As a result, a consumer cast into a market without advice or knowledge may be apprehensive.

Some sellers of goods and services provide additional information beyond urging a consumer to make a purchase. For example some online sellers track prior purchases of the consumer and make suggestions based on that history. Others track online activity and serve ads based on websites visited.

In contrast to providing information based a consumer's history, information may be provided concerning the environment in which the consumer is operating to assist him or her in making decisions. For example, it is known in gaming to provide information to players about specific machines that are paying jackpots either above or below par, which is the theoretical hold percentage set by the game's pay table. As is known, an electronic gaming device, such as a slot machine, is typically set to pay a percentage of all wagers made as jackpots. A typical such percentage may be around, e.g., 92%. This leaves the casino, on average and over time, with 8% of the wagers on that machine. But since the outcomes are all random, there can be random variations in either direction from the set percentage. As a result, some machines are temporarily "hot," i.e., paying more jackpots than par and others are temporarily "cold," i.e., paying fewer jackpots than par.

Many players have a preference for either a hot or a cold machine. If a machine is hot, he or she wants to take advantage and get their share. And some prefer a cold machine, the thinking being that it is overdue for a jackpot. Of course each outcome is random, but many players are superstitious, and casinos are happy to cater to them within the confines of gaming regulations. There is prior art in which a map of the casino floor shows hot and cold machines via color codes, enabling a player to find a machine that is currently in the condition preferred by the player.

Both the online sellers and advertisers, on the one hand, and the casino that generates a map of hot and cold machines, on the other hand, are providing additional data that can be helpful in making a decision. In the online instance, the data is based on historical information about the person who is making the decision; in the casino, the data is based on historical information about the environment in which the person must decide. While the additional information is helpful, there may not be someone there from whom the consumer can solicit advice or opinions or who will provide affirmation after the decision is made.

What is needed in these situations is a trusted advisor. Sometimes people turn to a friend for advice and support when making these kinds of decisions. A trusted personal friend is about the best advisor to be had. That person knows and understands the person making the decision, how the ramifications of various outcomes might affect the person, and what values the person holds that might influence the decision. A recommendation from such a trusted friend inspires confidence and hope. And regardless of the outcome that flows from the decision, nothing can match the presence of a close friend to provide affirmation, either celebratory when the outcome is good or empathetic and supportive when it is not.

It is possible to create hope and affirmation in circumstances similar to these utilizing a virtual persona. Such a persona may draw on historical information, either about the decision maker, the environment in which the decision maker operates, or both. The persona can inspire trust and confidence in a variety of ways, e.g., displaying the outcomes of past recommendations. In the case of several personae who advise about the same issue, such displayed results can produce competition for the allegiance of the decision maker based on the respective results of the personae. In addition, a persona can monitor outcomes and respond accordingly, either with celebration or with empathy.

What is more, a decision maker can be drawn into the "life" of the personae using computer technologies for analyzing text or other communications generated by the decision maker and responding accordingly. Beyond generation of trust, interest by the decision maker can be built by generating a story about the persona and, in the case of multiple personae, interactions among them. In these ways, a relationship with virtual personae can be built. The decision maker can come to know and appreciate the persona as a source of entertainment, information, hope, and affirmation. In such cases, the persona may be able to exert substantial influence on the acts of a person.

In one aspect, novel information regarding the hot and cold machines is communicated to the player other than through a virtual persona, but this information may also be communicated via a virtual persona with the accompanying benefits outlined above.

DETAILED DESCRIPTION

Figure 1A:
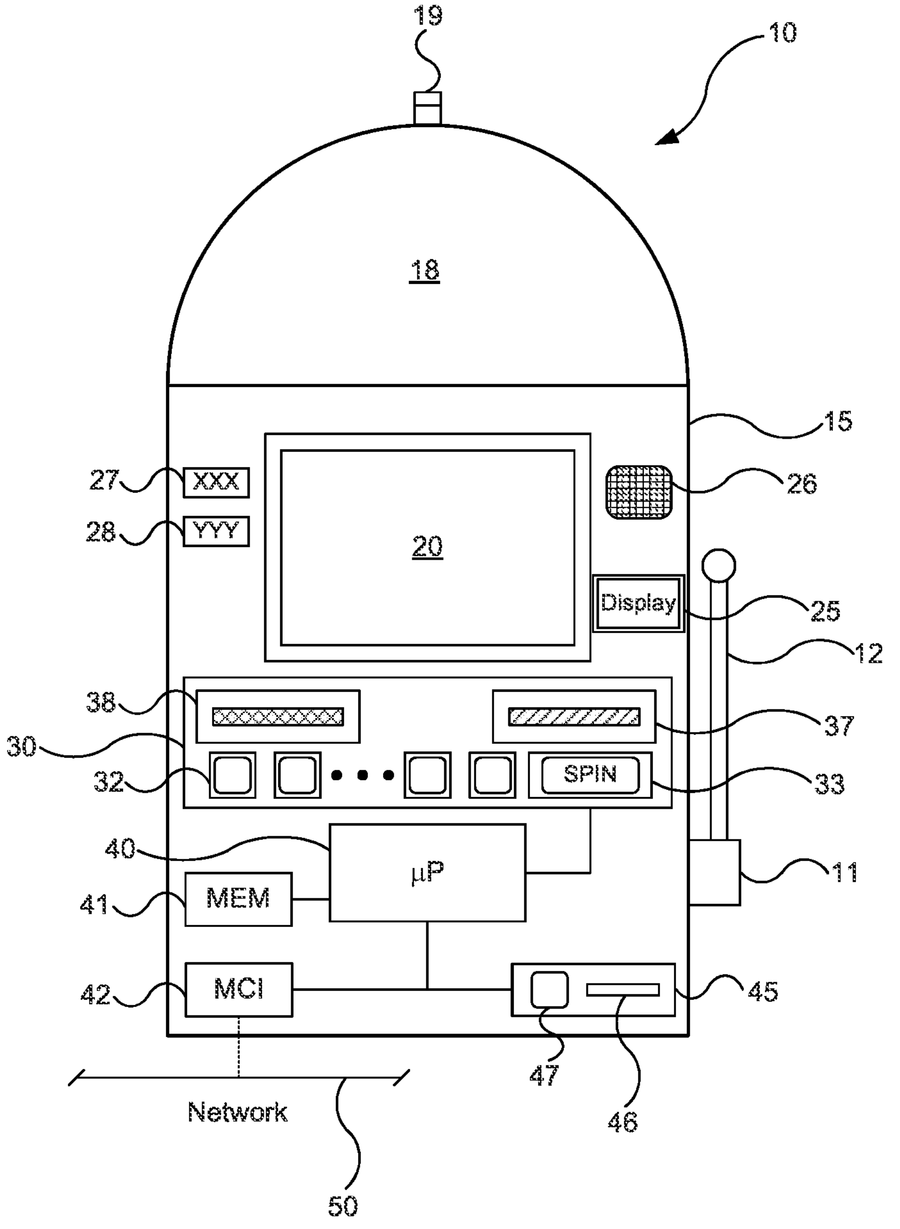
FIG. 1A is a functional block diagram that illustrates a gaming device according to embodiments of the invention.
Figure 1B:
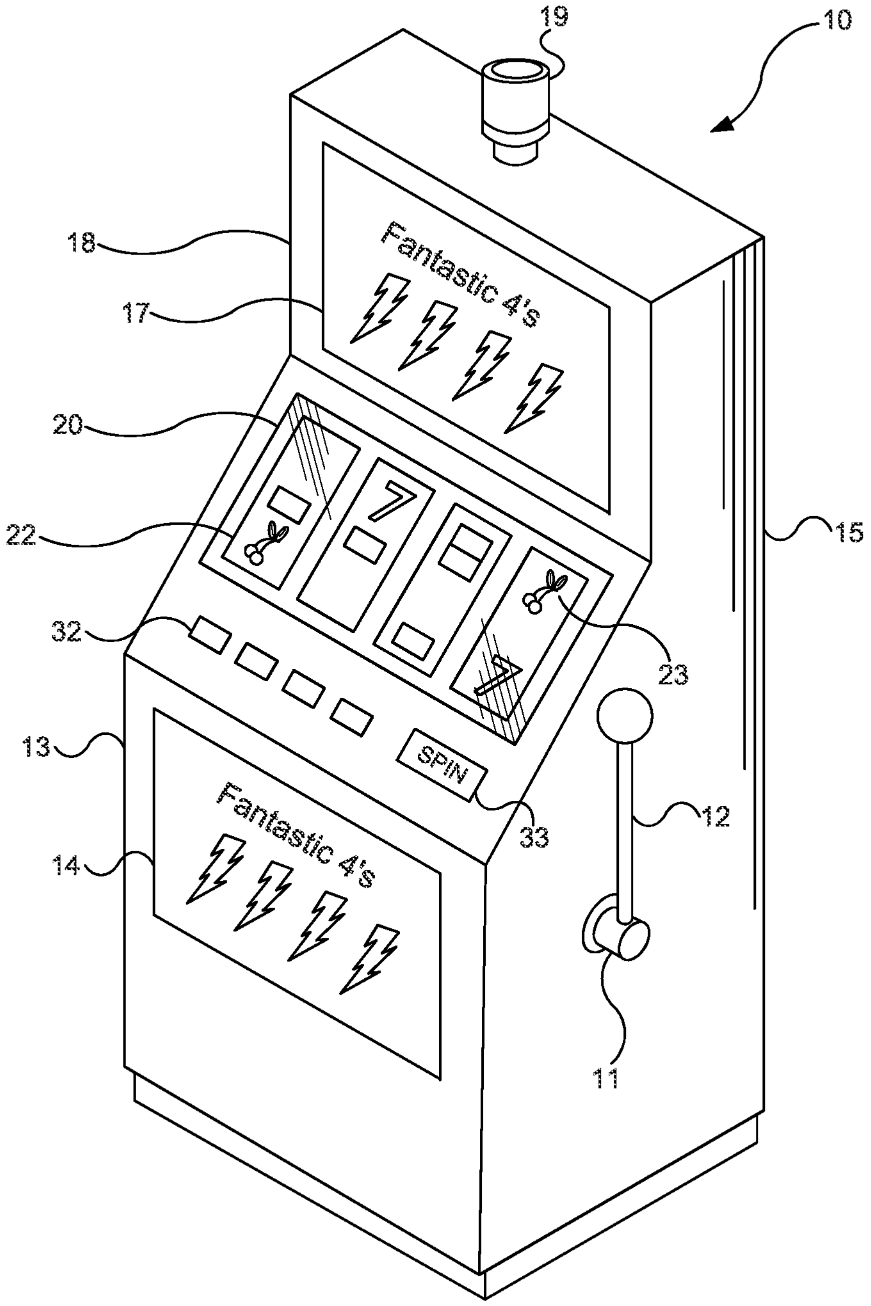
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
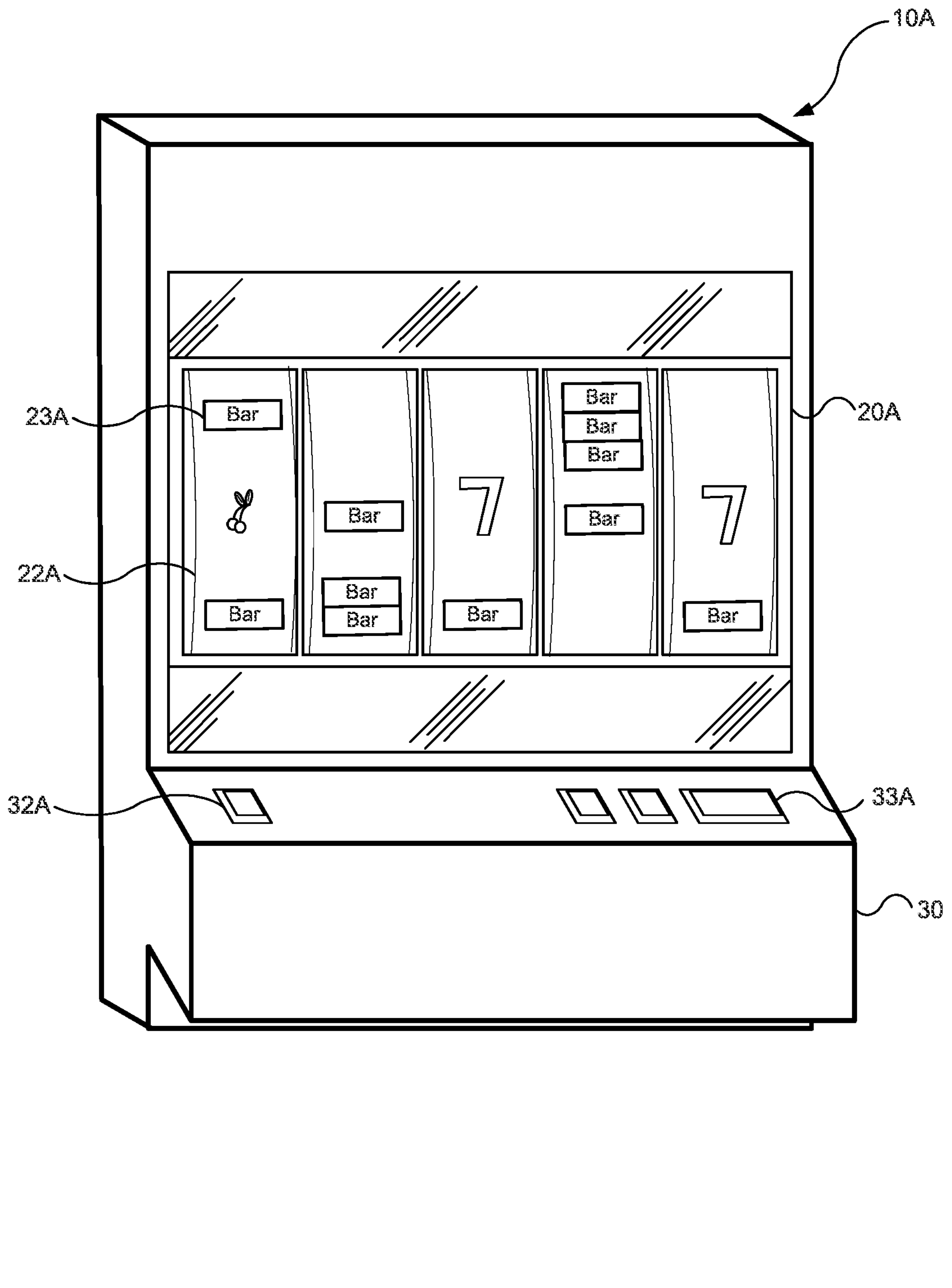
FIGS. 2A, 2B, and 2C are detail diagrams of exemplary types of gaming devices according to embodiments of the invention.
Figure 2B:
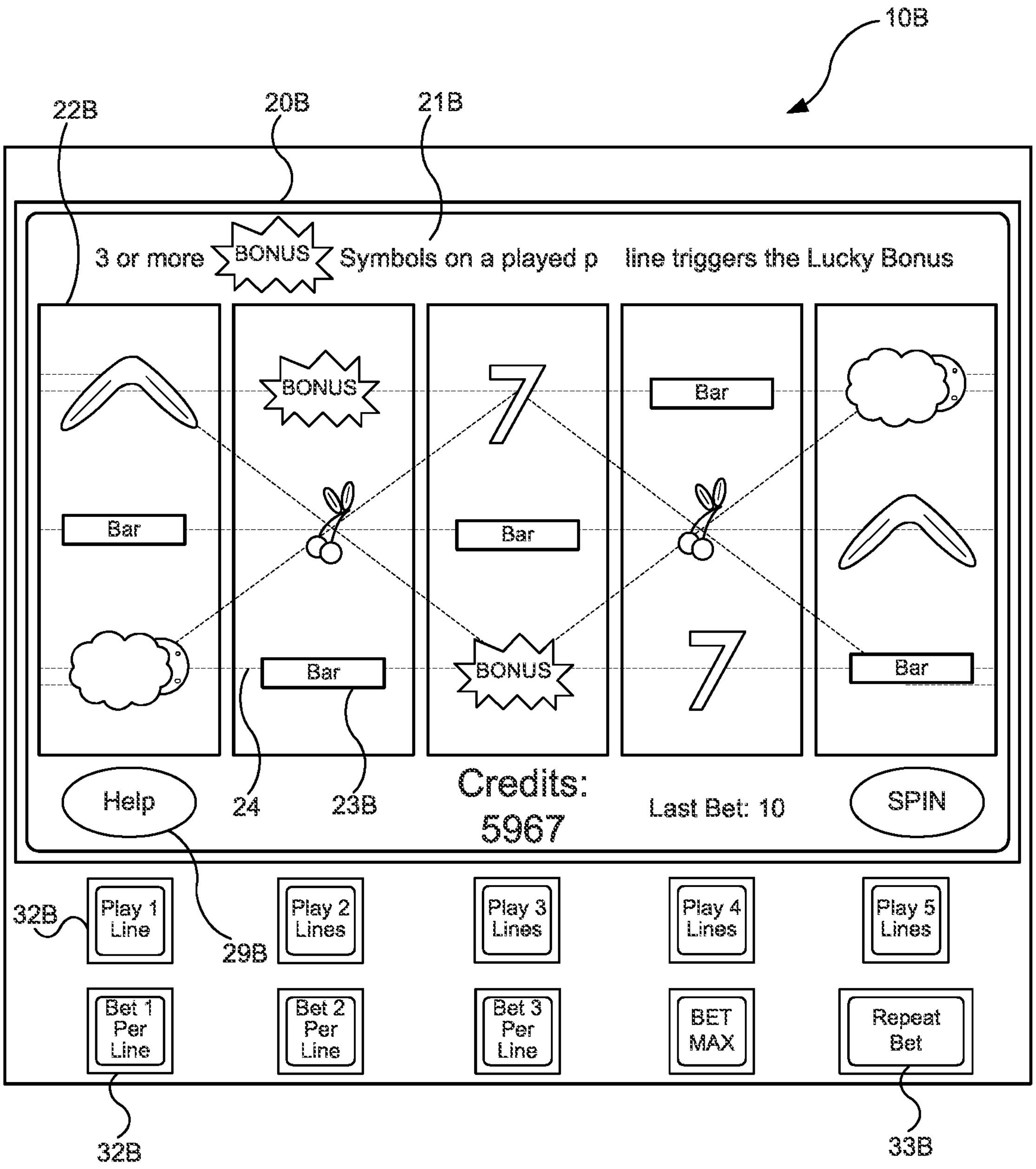
Figure 2C:
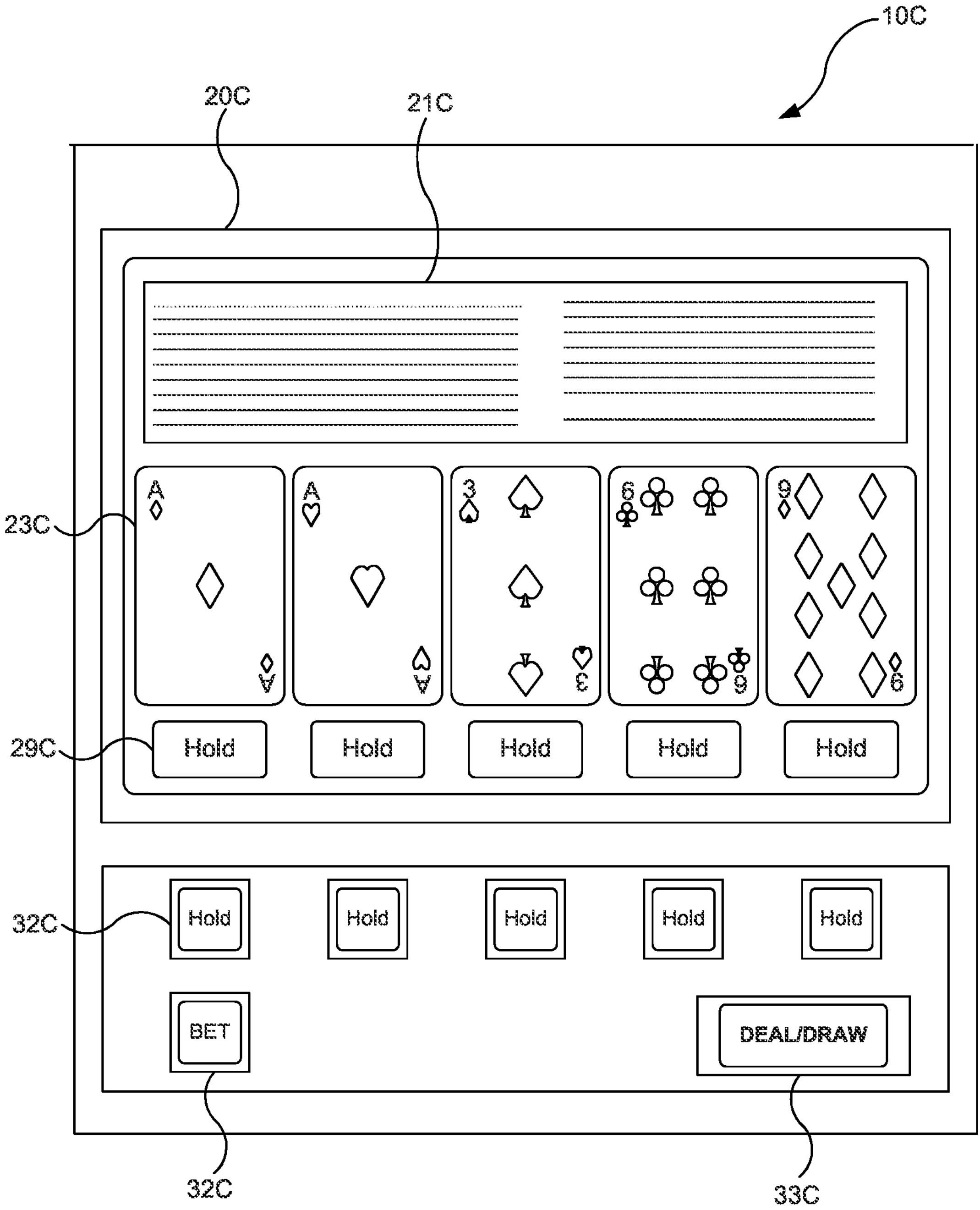

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display may be a CRT, LCD, plasma screen, or the like. It is usually preferable that the video display be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display bonuses, such as second screen bonuses are relatively easy to award on the video slot game That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
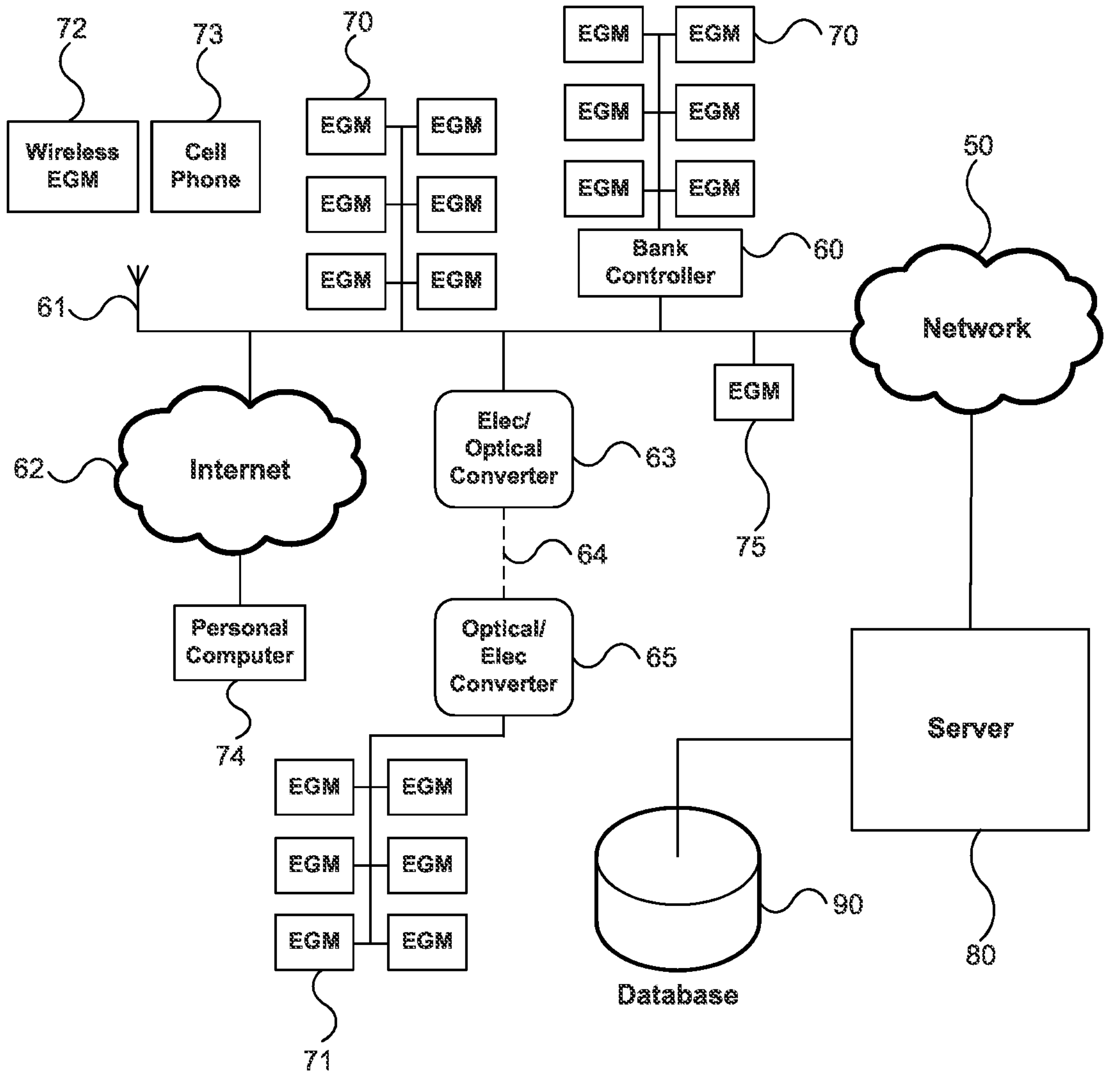
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
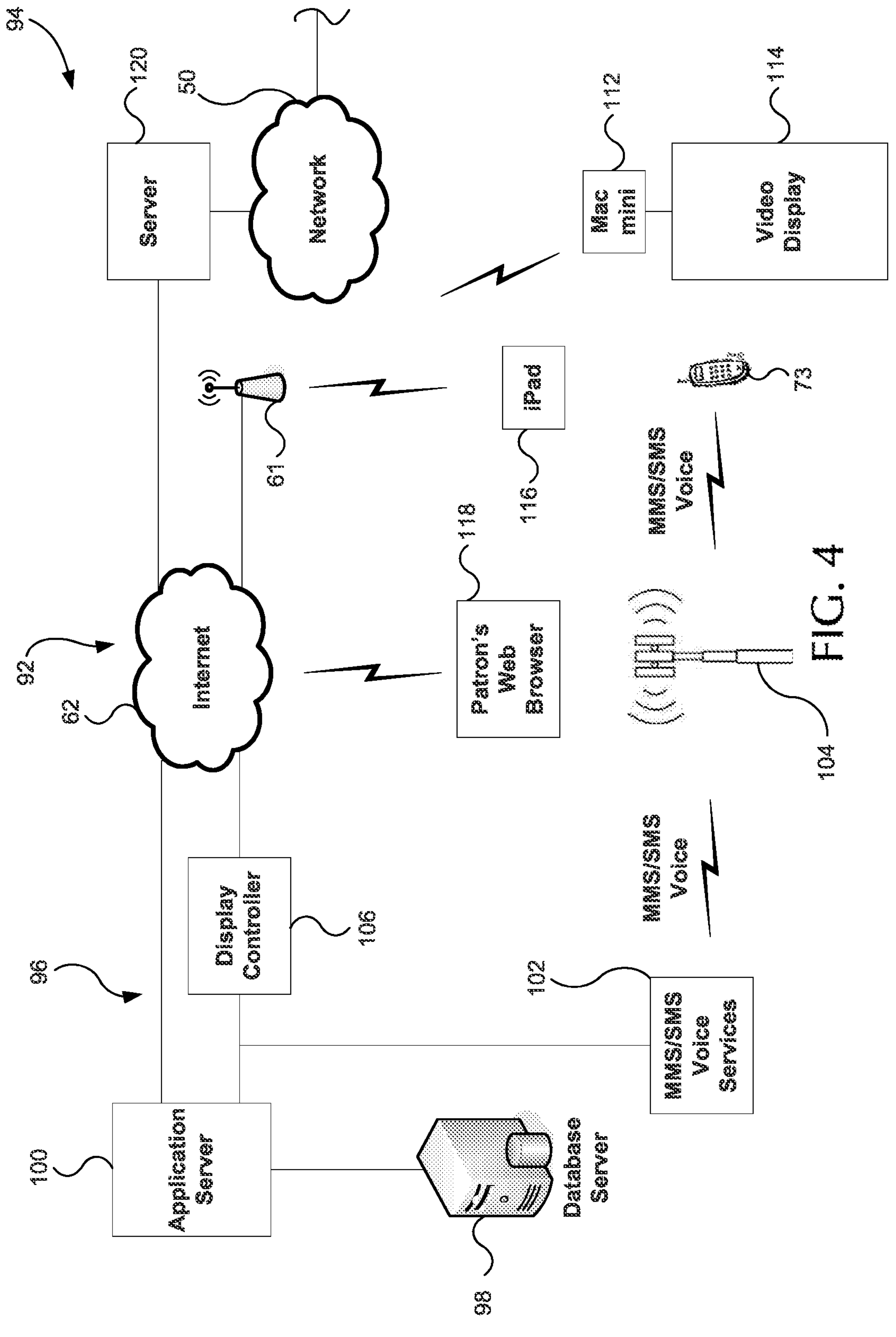
FIG. 4 is a schematic diagram illustrating an embodiment that incorporates the present invention.

Turning now to FIG. 4, indicated generally at 92 is a system constructed according to the present invention. In the present implementation, the system is distributed among several locations, primarily a casino—indicated generally at 94—and an offsite location—indicated generally at 96. Among other things, system 92 collects data, processes it, and creates communications at the offsite location hat are directed to players and potential players of casino games via their cellular phones regardless of where they may be. Because the present implementation of system 92 is deployed on several networks, it will be appreciated that the entire system could be located in one place or distributed along and among various networks. The solid lines connecting components in FIG. 4 indicate hard-wired connections, but these connections may readily be made via wireless connections.

As an alternative, the present invention may be readily implemented with all of the components in system 92 being located at casino 94, as shown in FIG. 4, or distributed via one or more networks. In the present implementation, offsite location 96 is built, operated, and maintained by a third party vendor to casino 94. The functionality described below may be provided to a number of different casinos, like casino 94, all responsive to software operating at location 96 via multiple, reliable Internet connections to each of the various casinos. Each casino could naturally have different (or the same) personae or the same personae but utilizing different audio-visual presentations, as described below. And the information related to hot and cold machines, and jackpot forecasts and results—as is described below—may be specific to each casino or across many casinos or any combination or subcombination thereof.

Considering first offsite location 96, a Database Server 98 collects data from the casino and stores it in a manner that will be later described in connection with the operation of system 92. An Application Server 100 provides support for software applications, to be shortly described, that are installed on various computing devices included in system 92. The application server provides the software applications with services such as security, data services, transaction support, and load balancing.

MMS/SMS and Voice Services 102 relates to cellular telephone communications that are incorporated into system 92. MMS refers to Multimedia Messaging Service, which is a standard way to send multimedia content—such as pictures, videos, and text—to and from cellular phones. MMS extends the prior standard SMS, which stands for Short Message Service, a standard for sending text messages up to 160 characters in length to and from cell phones. And Voice Service refers to the standard manner in which audio communications, typically speech, are communicated between locations on a cellular network.

Services 102 may be provided by a third party that is in the business of facilitating text messaging between its customer and others, or may be included as an integrated portion of system 92 located at offsite location 96 as shown in FIG. 4. As will be described, whether integrated into system 92 or provided by a third party, services 102 facilitates communication between system 92 and cell phone users that may be in casino 94 or elsewhere. Such communication, whether provided as part of system 92 or by a third party, is implemented in the present embodiment using a cellular network, represented by cellular antenna 104.

As discussed further below, communication via text, phone (either live or automated calling), email, or web browser may take place with a player or potential player wherever he or she may be. Such communication with those who are away from casino 94 can be a powerful tool for marketing by communicating promotions or information about specific games or machines as discussed below.

Such communication may also take place via a dedicated application that could be downloaded to a user's computing device, such as a smartphone, a tablet computer, or a desktop computer.

Concluding the description of that portion of system 92 residing at offsite location 96, a Display Controller 106 is connected to Database Server 98 via Application Server 100. The display controller controls and provides video content that appears on displays such as LCD or plasma displays. Controller 106 does the same for audio content, including music, sounds that corresponds to images to be shortly described, and other audio content. Alternatively, the casino's public address system, or part thereof, could be used to provide the audio content. Such displays and associated speakers may be relatively large for overhead viewing in casino 96. Or they may be of the type associated with a desktop computer or on a mobile computing device such as a cellular smartphone. The video displayed may be rendered to fill the entire display or may be transmitted via the Internet and ultimately appear in a web browser. Or a picture-in-picture presentation could be rendered on any computing device, including on the gaming device screen or an associated secondary display. More detail concerning displays and their use is provided in connection with the later description of the operation of system 92.

In the present implementation, many communications between offsite location 96 and casino 94 are conducted through the Internet 62 via a reliable, high-speed connection. In the casino, a wireless router 61 provides a wireless network for various computing devices as will be shortly described. Of course, the invention may be equally well implemented with a wired connection, such as Ethernet or other wired protocol. In the present implementation, the wireless network is implemented using the IEEE 802.11 standard, although any other wireless implementation may also be used. Included on the wireless network at casino 94 is a Mac mini 112, which is a small Apple Inc. computing device that is sold under the Mac Mini™ Brand name. The Mac mini 112 is connected to an LCD display 114, which is display that is mounted with its long side vertical and at a height and location that permits viewing by a large number of players and potential players. A number of images that appear on display 114 are included in the drawings and are described herein. Mac mini 112 and its corresponding Video Display 114 are exemplary of a plurality of such associated Mac minis and Video Displays that are not shown in the drawings for ease of explanation.

Also on the wireless network implemented via router 61 is an iPad 116, a small tablet computer also made by Apple Inc. and sold under the iPad™ brand. There may also be multiple such iPads that are omitted here to simplify the drawing. The iPads may be used, as will be described, to configure the Video Displays that are on the wireless network. A Patron's Web Browser 118, may be implemented on a mobile computing device, like an iPad or other tablet computer, or on a mobile smartphone. Or as mentioned above, a dedicated application that is separately downloaded or built in to the patron's computing device could also be used. These may be connected to the Internet via router 61, or via another wireless network implemented at the casino—or anywhere the use might be. Alternatively, browser 118 might connect to the Internet via a cellular connection. Finally, browser 118 may be connected to the Internet via a desktop computer at the user's home or office. In short, browser 118 may appear wherever the Internet may be accessed and on any kind of device that may be connected thereto.

A Server 120, also located at casino 94 in the present implementation, is connected to the Internet 62 and to network 50, which is shown in FIG. 3 and described above. In many casinos, a management system, such as IGT Advantage™ made and sold by IGT, resides on network 50. It collects data from each gaming machine on network 50 and stores the collected data, e.g., in database 90 (FIG. 3). Such data includes, among other things, coin in (amounts bet) for each gaming machine, coin out (amounts paid as jackpots) for each gaming machine, and number of jackpots for each gaming machine. These management systems store this information and also aggregate it to produce daily, weekly, and monthly statistics, e.g., total wagered for casino, total awards paid, total number of jackpots paid, etc.

Consideration will first be given to the kind of data collected by server 120 from network 50. This data is transmitted from server 120 via Internet 62 to offsite location 96. In the present implementation, server 120 accesses information on database 90 via network 50. Server 120 collects daily coin in, daily coin out, and number and amount of all jackpots, including jackpot amounts and player identity. It also collects information about significant jackpots for the entire casino, although this information could be collected by machine as well. The collected information includes the number of such jackpots each day and the total number of such jackpots. The term significant jackpot can be defined as jackpots over a certain dollar amount, or all hand paid jackpots, or any other criterion that the casino might like to apply. In the present embodiment, the daily number and amount of significant jackpots throughout the entire casino is collected in substantially real time, i.e., shortly after it occurs. At the end of each business day the collected significant jackpot amounts and number of such jackpots is summed for that day and stored as the day's total. Totals for at least the previous 30 days, stored by day, are stored.

At the end of each business day, the daily coin in and coin out for each machine on the network is collected. Alternatively, these figures may be tallied throughout the day, thereby maintaining a cumulating count by time period, such as hourly, or substantially in real time. Database 90 also stores the configured theoretical hold for each machine. It will be recalled that this is the percentage average percentage of all wagers over time that the machine is designed to retain for the operator, the remainder being paid out as jackpots. A typical theoretical hold is 8%, although this can vary considerably depending on the game, the operator, and the location.

This collected data is processed in a manner that will be soon explained and communicated to players and potential players of the gaming machines via virtual personae that appear on Video Displays, like Video Display 114, or browsers, like browser 188, or both.

First, considering how the data is processed, the daily amount and number of jackpots is examined for the previous 30 days. If the next business day is a Friday, the jackpot numbers for the preceding 4 Fridays are summed and averaged. This provides a total number of significant jackpots and a total amount of significant jackpots averaged for recent Fridays. As will shortly be seen, these numbers are used to make forecasts at the beginning of the Friday business day about how many significant jackpots will be awarded and how much those will total for the entire casino. As jackpots occur substantially in real time on Friday, a total actual number of significant jackpots for the day and a total actual amount of significant jackpots awarded are accrued and periodically displayed to permit the actual numbers to be contrasted with the forecasted numbers.

In one embodiment, the Friday average for each value, total jackpot number and total jackpot amount, is multiplied by a variable that ranges between about 0.8 and 1.2 to provide additional variation in the prediction. At the end of each business day, the daily coin in and coin out are used to calculate the actual hold for the preceding business day for each machine. This is subtracted from the corresponding theoretical hold for each machine. Each machine therefore has a number associated with it that indicates its variance from the theoretical hold for which it was configured. As a result, the machines can be ranked to determine, e.g., the top 10 hottest machines (those holding the least relative to their configured hold) and the top 10 coldest machine (those holding the most relative to their configured hold). These machines can be recommended to players, some of whom will be drawn to the hot machines and some to the cold. Each day, the identity of each recommended machine is stored at Database Server 98.

There are many other ways to calculate when a machine is hot (or ready), e.g., total number of jackpots paid (independent of amount), total amounts paid in jackpots over a predefined amount, e.g., $100, etc.

The data can be used to generate other kinds of comparisons, e.g., during the last month, a particular machine is hottest on Thursday evenings. Even if that machine is paying below par, it could be declared to be the "hottest" time for that game. The comparison need not involve the theoretical payback percent.

Also, games that are the hottest in relation to one another could be recommended. For example, machine 1285 has paid out $4,100 on $8,000 played and machine 1563 has paid out $1,300. Also, comparisons between both hot and cold machine may be broken down into game types: pokers, video lots, mechanical slots, 3 reel slots, 5 reel slots, etc.

They could also be rated by group using criteria other than amount wagered and awarded. For example, identified machines may be labeled the hottest because they paid out the most jackpots over $100, because they paid out the most jackpots in total, because the paid out the highest quantity of jackpots (regardless of amount), etc.

In another example, Red, White and Blue Games can be compared to Double Diamond games using almost any metric, e.g., total payments regardless of how much play machine has, total payments in relation to play, times of day when jackpots occur, etc.

A game or a group of games could be tracked across a period of time: game 1242 or some group of games generate the most awards on Friday evenings between 3 PM and 6 PM.

Games could also be promoted based upon how much they pay for certain customers. The player identity is known—and this often includes a birth date. This would allow the system to collect information about all those whose birthday is known and generate a message that ties their gaming data to their birthdate, e.g., "People born in January win most on Red White and Blue games", etc.

In addition to making comparisons and recommendations within a casino as outlined above, the same kind of statistical data can be collected, not only for single game or groups of games within a casino, but also casino-wide, state-wide, country wide-world-wide, etc. This data can be used to generate any statistical information and comparisons that could be drawn from the collected system, including those described above.

In one application, casinos that are linked together via a network, which may result from common ownership or control, may have games rated across all casinos or a subset of them, including a subset of games within a specified casino. As a result, recommendations could be generated for the hottest, coldest, or luckiest casino, as well as the hottest, coldest, or luckiest, machines, time of day, day of week, area within a casino, etc. As used here the term luckiest may be used to identify the results of a comparison of statistical analysis related to hottest, coldest, most jackpots over a predefined amount, most jackpots of any amount, etc.

Because many player tracking systems track patrons as they spend money in shops, at shows, and in restaurants, it would be possible to identify a lucky venue, e.g., people who ate at a particular restaurant on an identified night or day of the week won more than the general population.

Because the system collects and stores the coin out for each machine, it can periodically display the total jackpots that were awarded the preceding day, or any other time period for machines that were recommended on that day. The above-described collected data and information that results from processing it are all stored on Database Server 90.

The present invention could be equally well implemented by installing monitoring equipment within each slot machine that tracks the amount and rate of play independently of any tracking by the casino's slot accounting or player tracking systems. Such dedicated equipment could wirelessly, or otherwise, transmit data about wagers made, awards paid, and player identity to offsite location 96 for processing as described herein.

In the present embodiment, the gaming machines in casino 94 are divided into 4 floor areas and 4 sections of the networked games that are contained in the associated floor area. A display, like Video Display 114, may be physically associated with each of the floor areas. The coin in and coin out for all the machines may be aggregated for the games on the network section within each area and then presented on each area's associated display. The machine recommendations and results of prior recommendations are also processed for each area and then presented on the corresponding area display. The jackpot amounts and numbers, however, are casino wide. The present invention could be implemented using data collected from the gaming machines in a variety of ways: it could all be system wide; all by separate areas; or any combination of data, some system wide and some from the area associated with the display.

Figure 5:
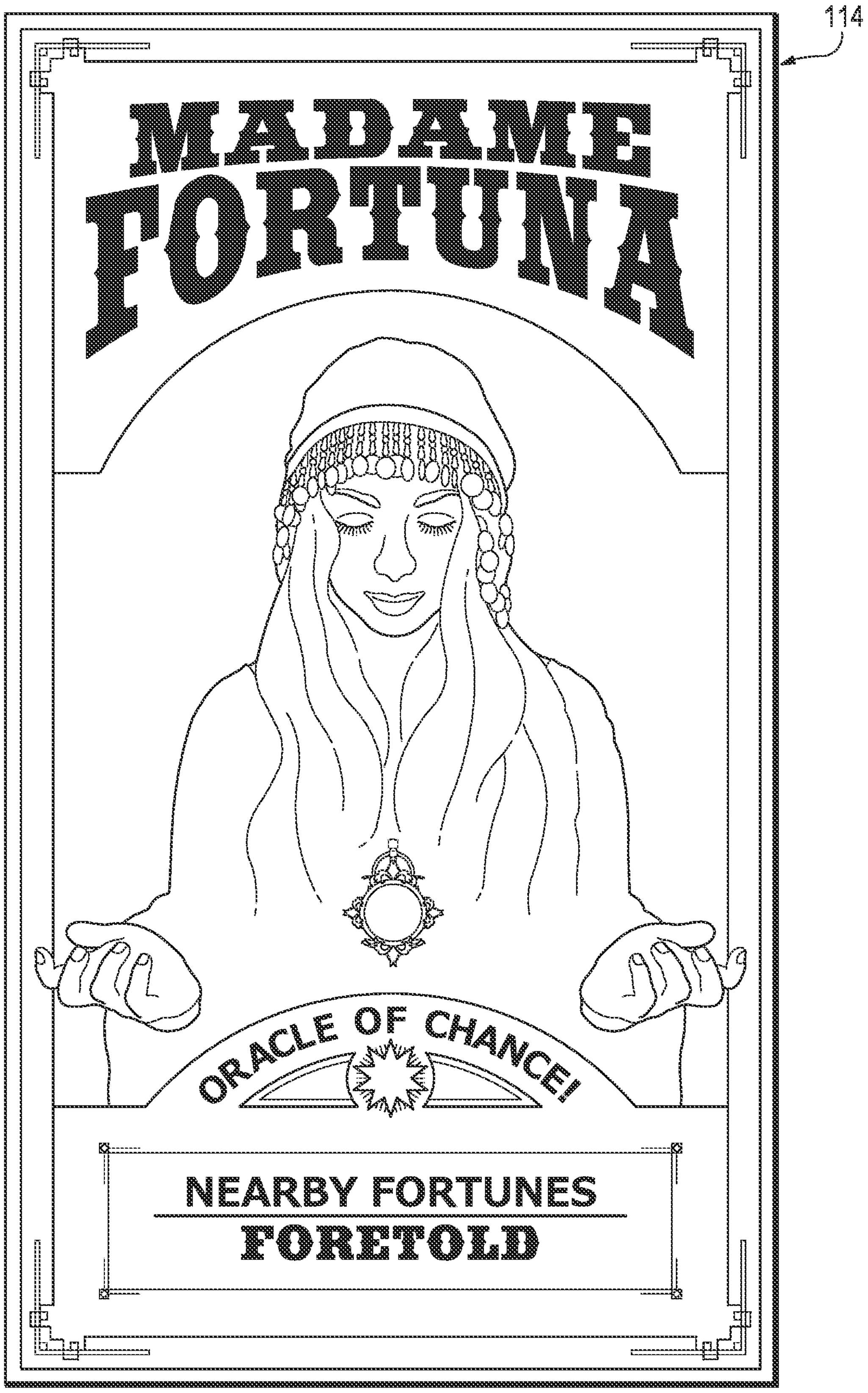
FIGS. 5-13 illustrate various stages of communication via a first virtual persona implemented on a display.

Consideration will now be given to the manner in which this information is communicated to a player or a potential player. Turning first to FIG. 5, display 114 is shown with an image thereon, which substantially covers the entire display. It is of a virtual persona, in this case a character named Madame Fortuna. She is presented as an oracle that has the ability and power to make forecasts, including predictions and recommendations. In the present embodiment, Madame Fortuna is generally still except for the opening and closing of her eyes and eye movement when open. The background red curtains move gently during the entire presentation.

Although Madame Fortuna is virtual, audio-visual representations of a real person could be used as described below, i.e., there is a virtual representation but it is based on and represents a real person.

Figure 6:
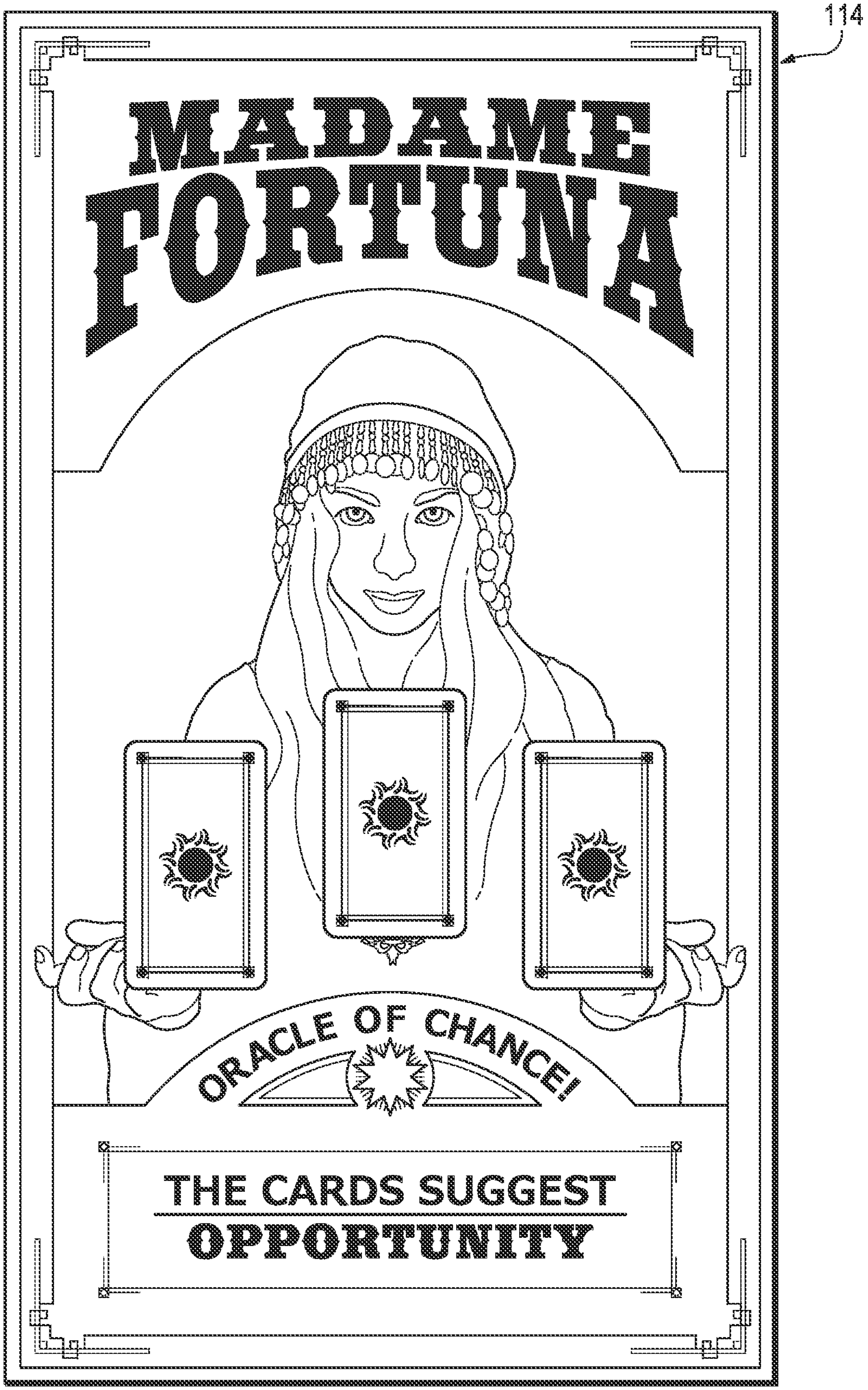
Figure 7:
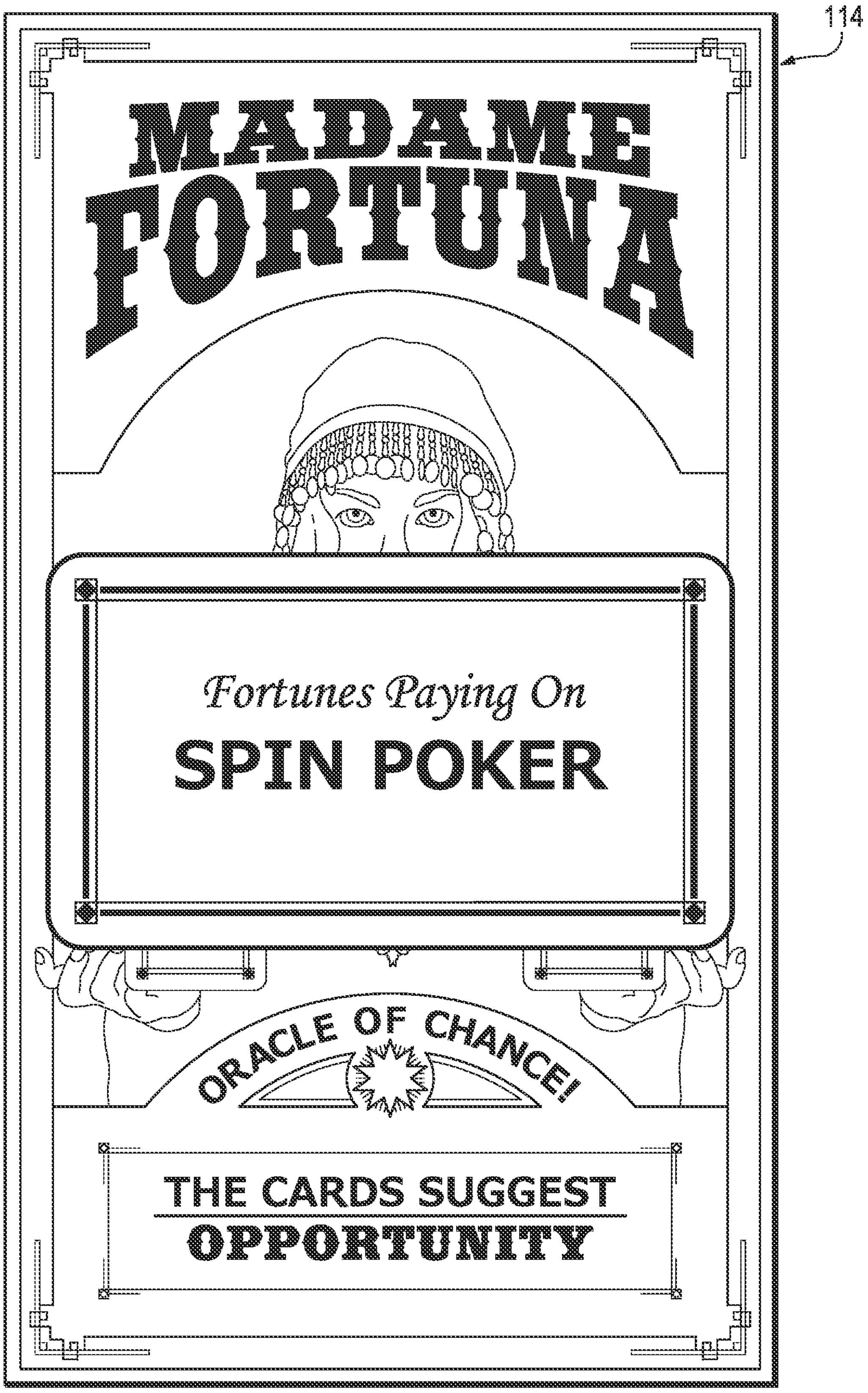

The cards appearing in FIG. 6 indicate that a forecast is about to be made. In the transition between FIGS. 6 and 7, the cards rapidly switch positions with one another for a few seconds. The center card then turns sideways and enlarges, thus appearing to move toward a viewer of the display. In FIG. 7, it identifies the hot games—by game name, SPIN POKER—that are associated with Madame Fortuna's area of the casino. This could be one or more games randomly chosen from the list of top 10 hottest games in her area or games could be recommended in sequential order. Because the casino system in FIG. 3 can determine in substantially real time which machines are being played, those being played could be removed from the list and a machine that does not have a player could be recommended. Of course the list does not have to be limited to 10; it could be any number from one ranging up to all of the machines in Madame Fortuna's area—or casino wide.

And it need not identify one or more particular machines. It could calculate the hottest machines by type and could therefore recommend playing a certain themed gaming machine, e.g., SPIN POKER, as illustrated in FIG. 7. In fact, the recommendation need not be tied to the data; it could simply be for a machine, bank of machines, or theme of machines on which the casino would like to generate more play.

Figure 8:
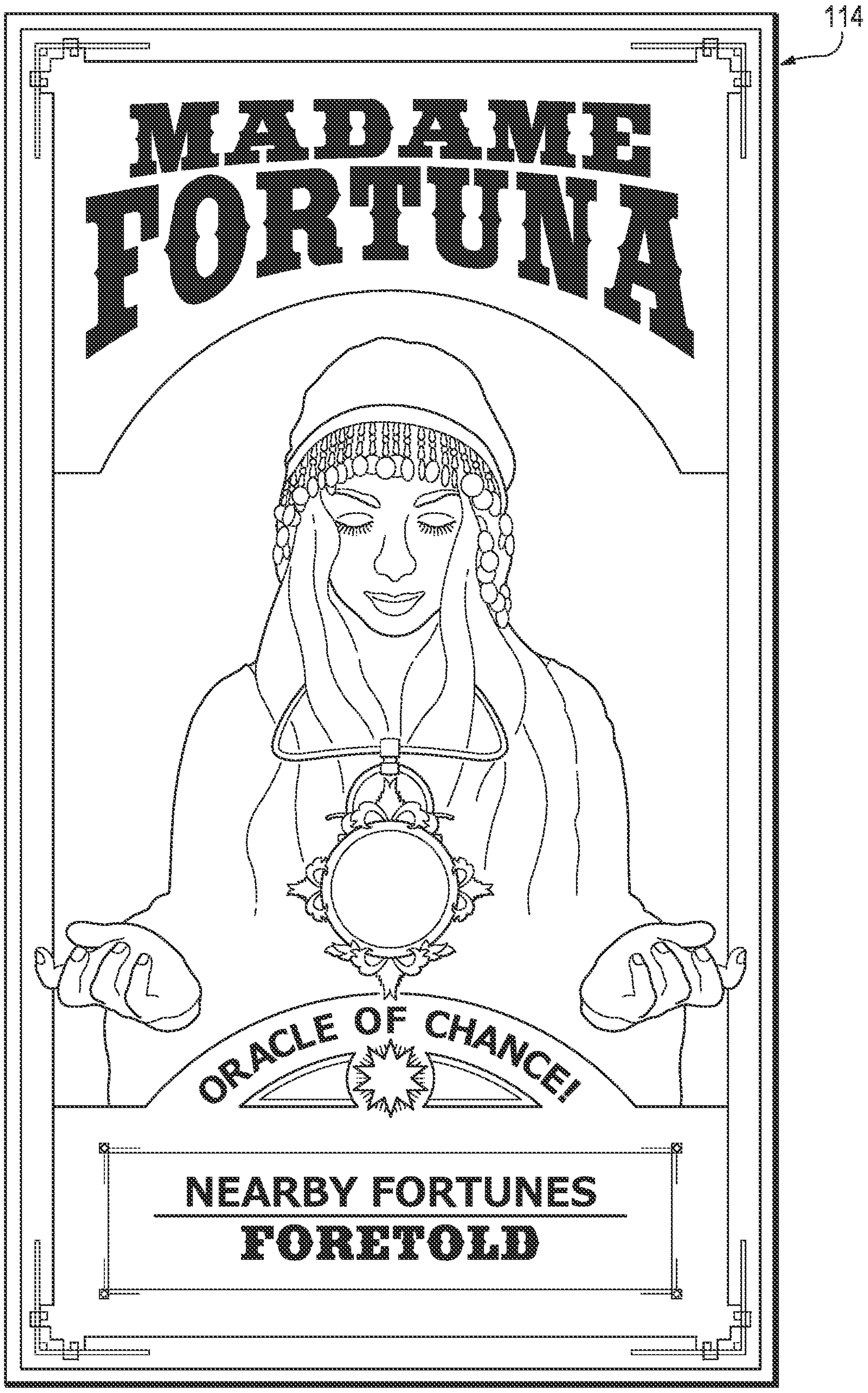

Turning now to FIG. 8, in the transition between FIGS. 7 and 8, the card recedes and all 3 cards disappear. Madame Fortuna may sit quietly while additional viewers are drawn. She may open her eyes, appearing to look at whoever is observing the display. She may wink. Because in this implementation, she is generated using the Adobe Flash™ platform, she can be made to behave in any fashion. Of course any combination of photographic or video images and computer-generated images can be used with any type of suitable system for generating animations to appear on Video Display 114.

Figure 9:
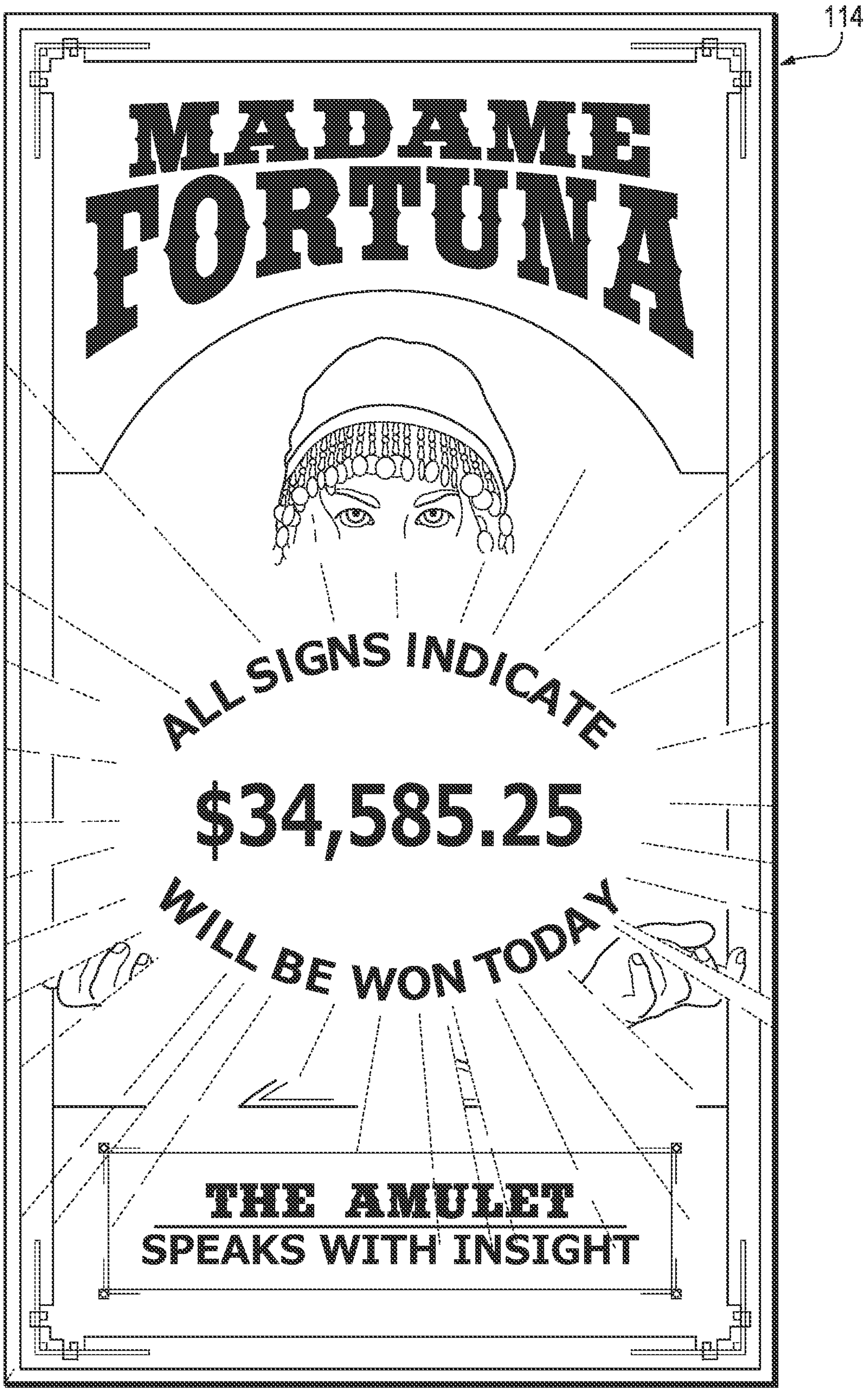

In FIG. 9, Madame Fortuna displays the daily, casino-wide, dollar-amount of predicted jackpots generated as described above. In the transition between FIGS. 8 and 9, the amulet enlarges, begins to glow, and rotates, appearing to move toward a viewer of the display. The glow increases until it appears as in FIG. 9 as a ball of light with a prediction on jackpots for the day. In the present implementation, the ball of light rotates, thus creating an attractive visual effect as the radial light rays turn about the center of the light ball.

Figure 10:
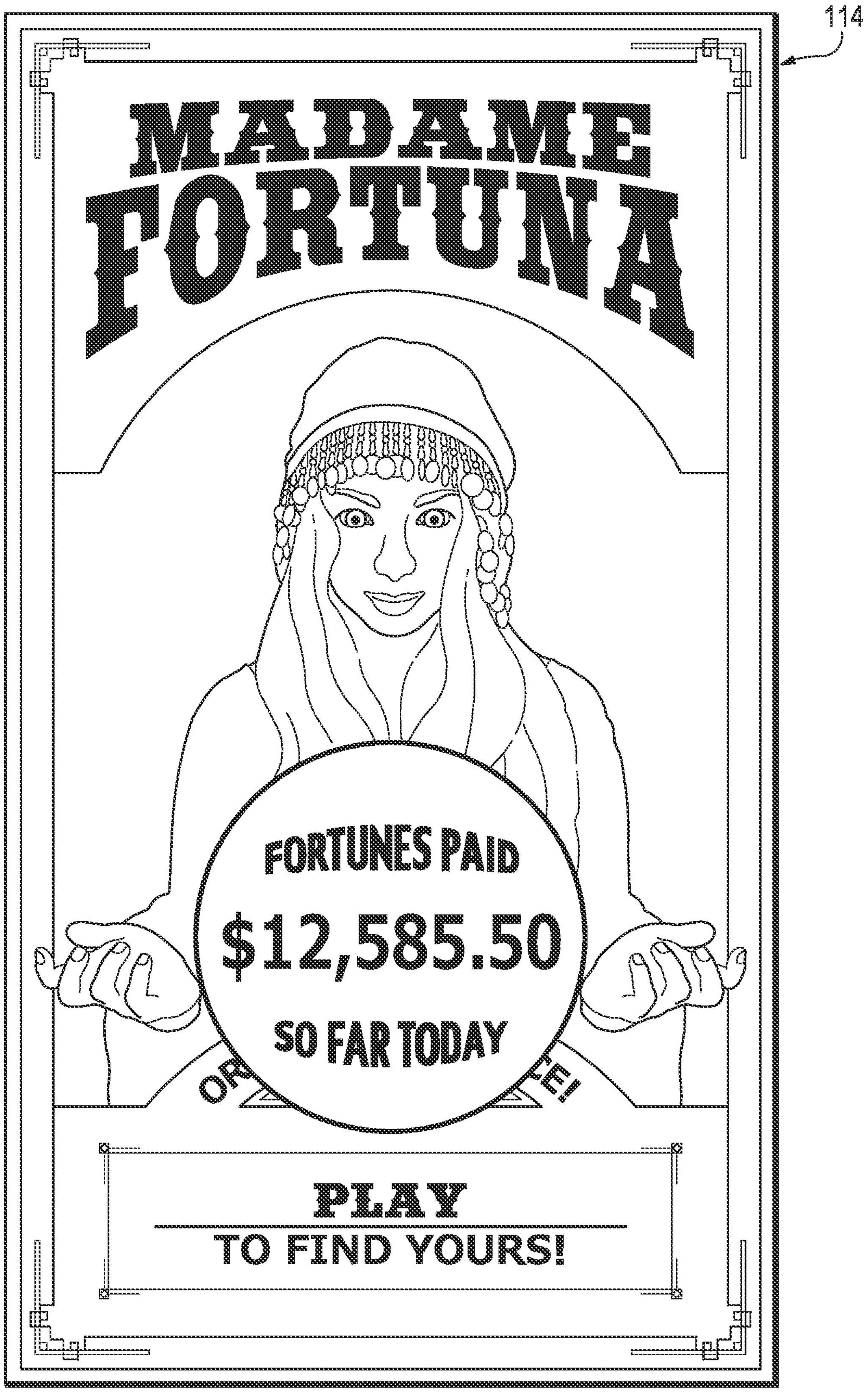

In FIG. 10, Madame Fortuna displays the accrued current dollar amount of significant jackpots casino wide. In the transition between FIGS. 9 and 10 the light ball gradually transforms into the golden crystal ball of FIG. 10, which includes the current accrued amount of actual significant jackpots for the day. This enables a viewer to quickly compare the forecasted amount for the day in FIG. 9 with the accrued actual count in FIG. 10.

Figure 11:

FIG. 11 shows the total amount of dollars paid yesterday on the machines recommended (as in FIG. 7) yesterday. In FIG. 11, the cylinder having letters around it, sometimes referred to as a cryptex, appears and the scroll with the writing shown in FIG. 11 lowers down, revealing the results of yesterday's suggested games.

Figure 12:
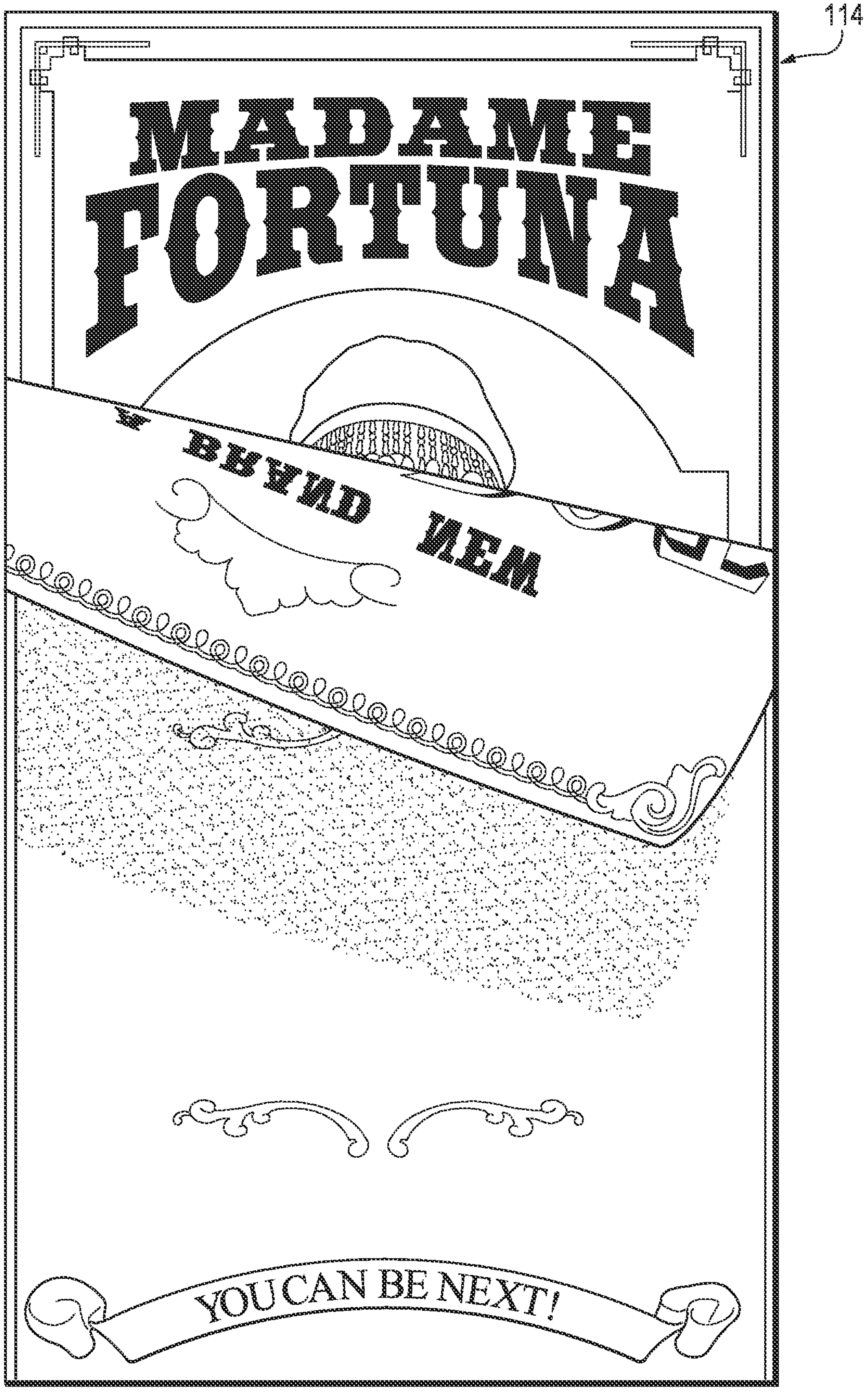
Figure 13:

The final figures, 12 and 13 indicate the display when a significant jackpot occurs, substantially in real time, anywhere in the casino. A paper poster starts rolling up over the display to cover Madame Fortuna as shown in FIG. 12. Reversed words that appear on the front of the poster are visible in FIG. 12. In FIG. 13 the poster covers the entire display, celebrating the recent jackpot by displaying $4500 TRIPLE DIAMOND, thus providing the amount won and the name of the type of game on which the win occurred. This happens substantially simultaneously on each of the displays in the casino. After the brief jackpot celebration, the scroll disappears and the display resumes its sequence as described in connection with FIGS. 5-11.

Different aspects may be repeated rather than sequentially advancing as described herein. For example, there might be a sequence in which several different games in a row are recommended. Or the recommendations might be interspersed with displays of results and predictions. Any combination of these displays may be equally effective.

Madame Fortuna's personality and audio-visual presentation is hot and lively. She speaks to the recreational players whose main goal is to have fun. They are care-free gamblers who are not searching for the big jackpot. They enjoy the dynamic give and take of volatile machines. Losing is the price paid for an entertaining experience.

Figure 14:
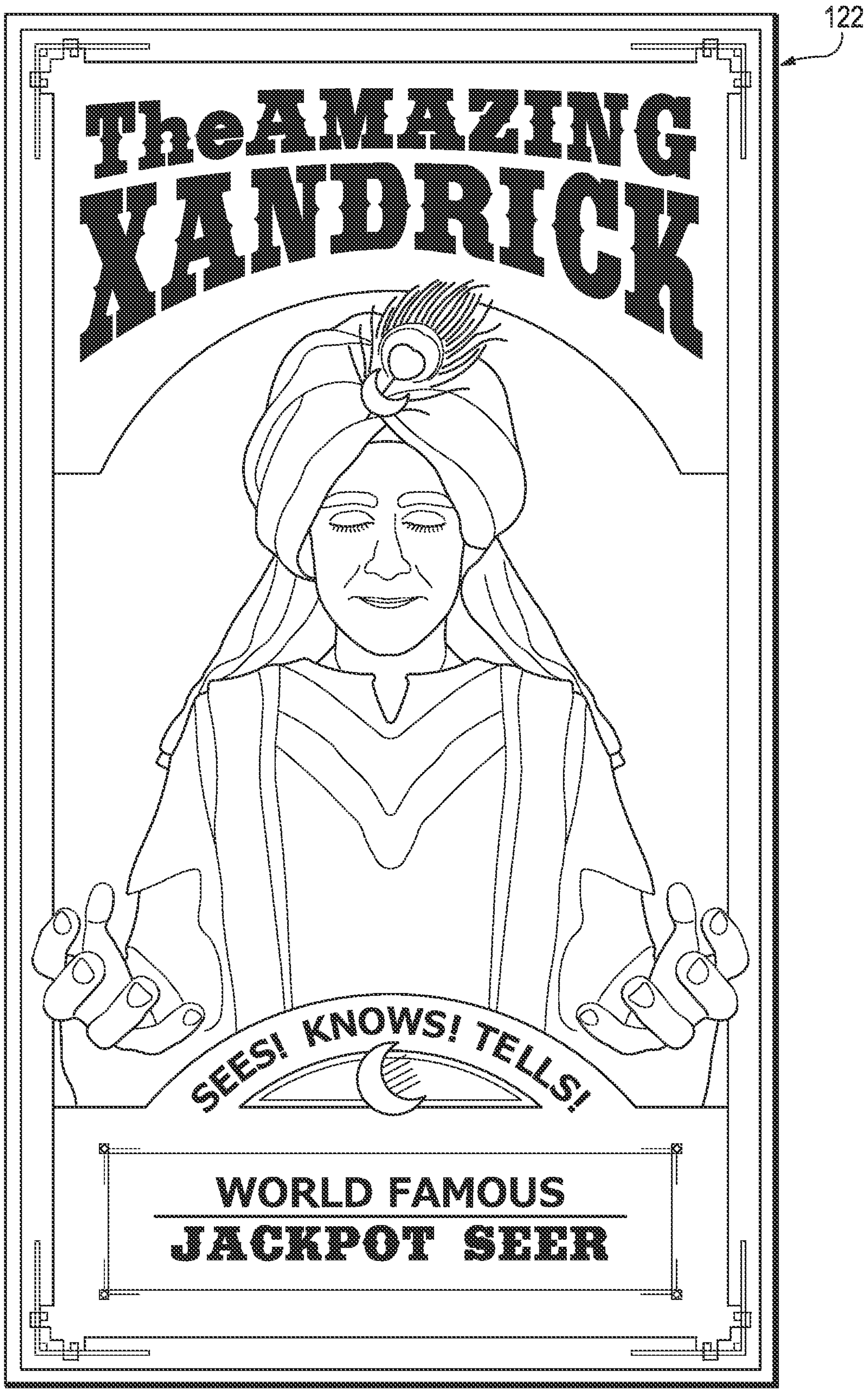
FIGS. 14-20 illustrate stages of communication via a second virtual persona implemented on a display.

Turning now to FIG. 14, a second display 122 is shown with an image thereon, which substantially covers the entire display. Display 122, although not shown in FIG. 4, is substantially identical to display 114 and includes an associated Mac mini, like Mac mini 112. As a result, display 122 is also connected to Internet 62 via router 61 and can therefore communicate with offsite location 96 in the same manner as display 114. Display 122 is physically associated with an area of the casino different from the one with which display 114 is associated. The recommendations and results of prior recommendations are calculated for only those gaming machines that are physically associated with display 122 and then displayed only thereon.

Display 122 also displays a virtual persona, in this case a character named Xandrick. He is presented as an oracle that has the ability and power to make forecasts, including predictions and recommendations. In the present embodiment, Xandrick is generally still except for the opening and closing of his eyes, eye movement when open, and vertical movement of eyebrows, somewhat in the style of Groucho Marx. The light in the background blue sky fluctuates while stars, which can be seen as bright pinpoints of light, move across the heavens.

Figure 15:
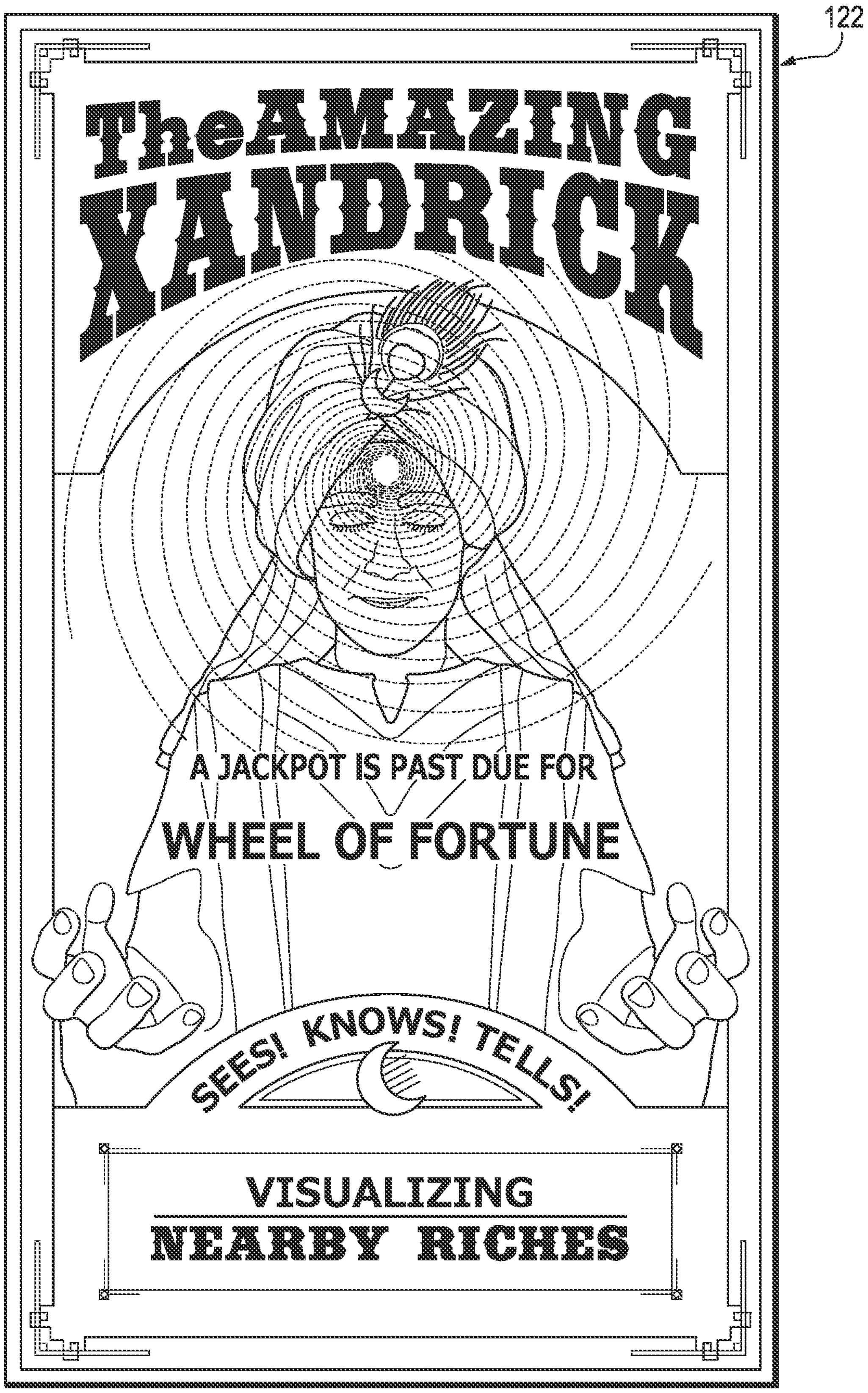

After Xandrick is displayed as shown in FIG. 14, a rotating spiral materializes in FIG. 1*t* has a center of rotation on Xandrick's forehead. This indicates that Xandrick is about to make a forecast, in this case a recommendation. After several seconds of spiral rotation, the words delivering the forecast appear as shown in FIG. 15. In this case it is a recommendation to play a cold game, by game name (which may include more than one machine) that is associated with Xandrick's area of the casino. This could be one or more games randomly chosen from the list of top 10 coldest games in his area or games could be recommended in sequential order. Because the casino system in FIG. 3 can determine in substantially real time which machines are being played, those being played could be removed from the list and a machine that does not have a player could be recommended. Of course the list does not have to be limited to 10; it could be any number from one ranging up to all of the machines in Xandrick's area—or casino wide.

And it need not identify one or more particular machines. It could calculate the coldest machines by type and could therefore recommend playing a certain themed gaming machine, e.g., Wheel of Fortune™, as illustrated in FIG. 15. As with Madame Fortuna, the recommendation need not be tied to the data; it could simply be for a machine, bank of machines, or theme of machines on which the casino would like to generate more play.

Figure 16:
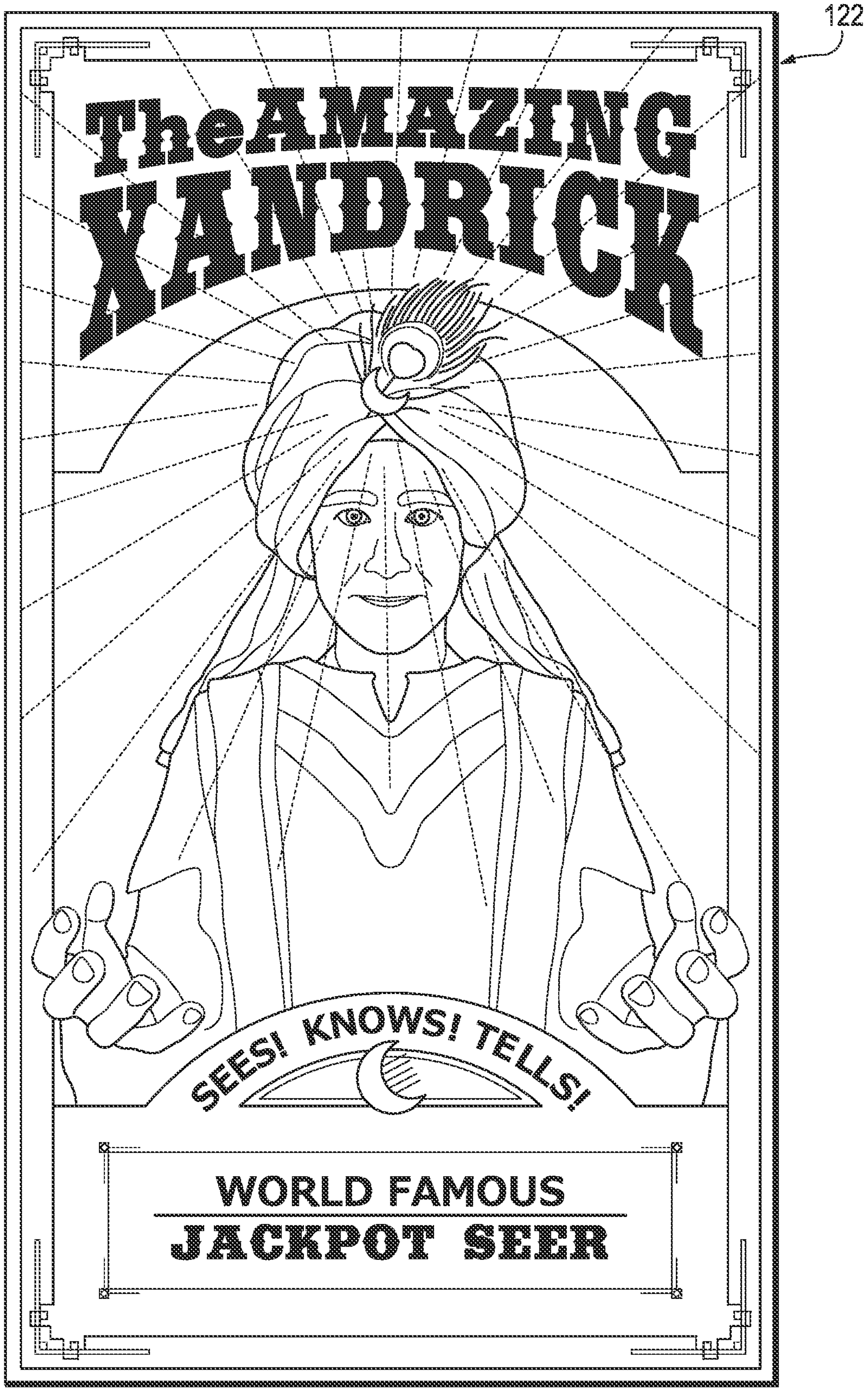
Figure 17:
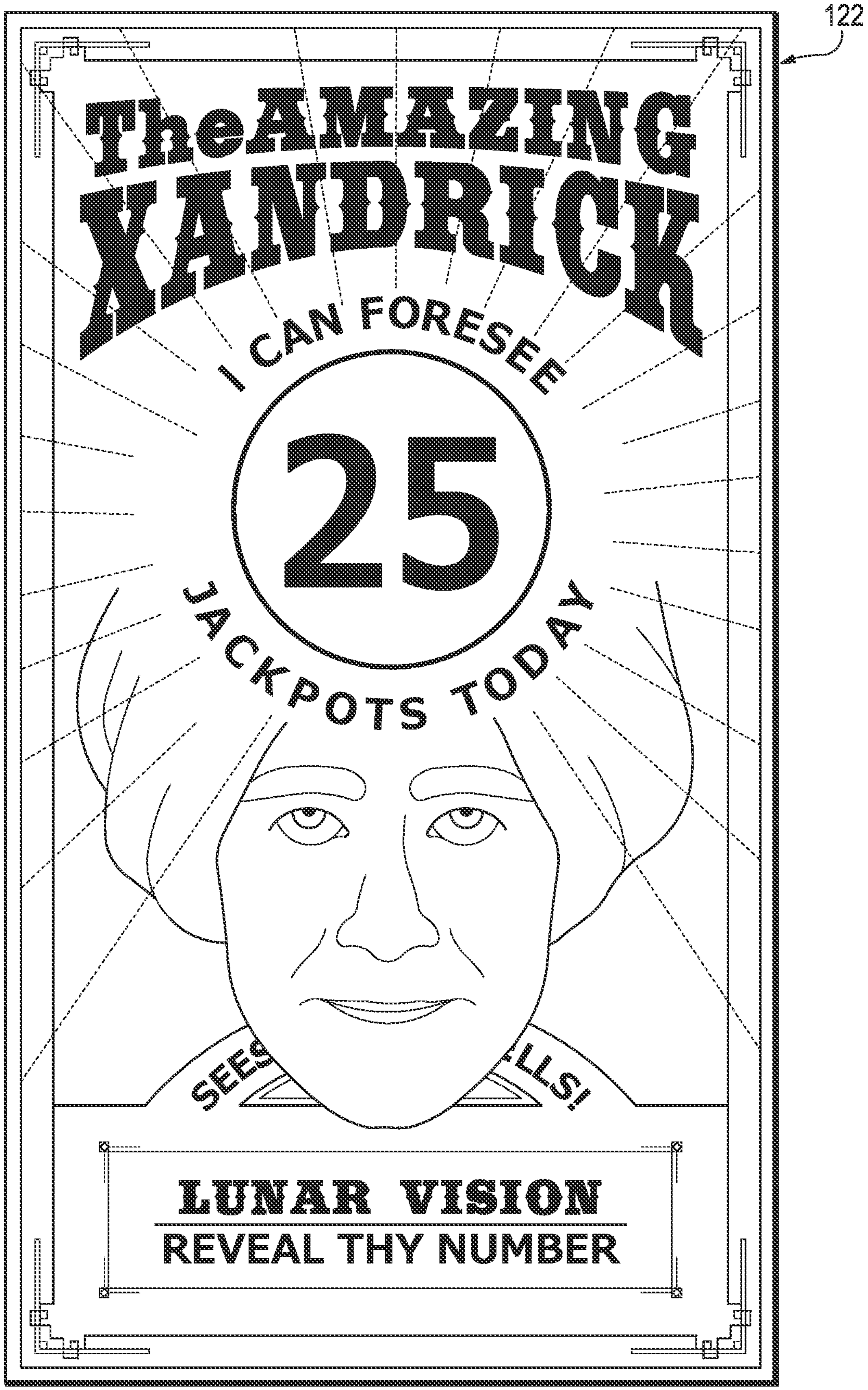
Figure 18:
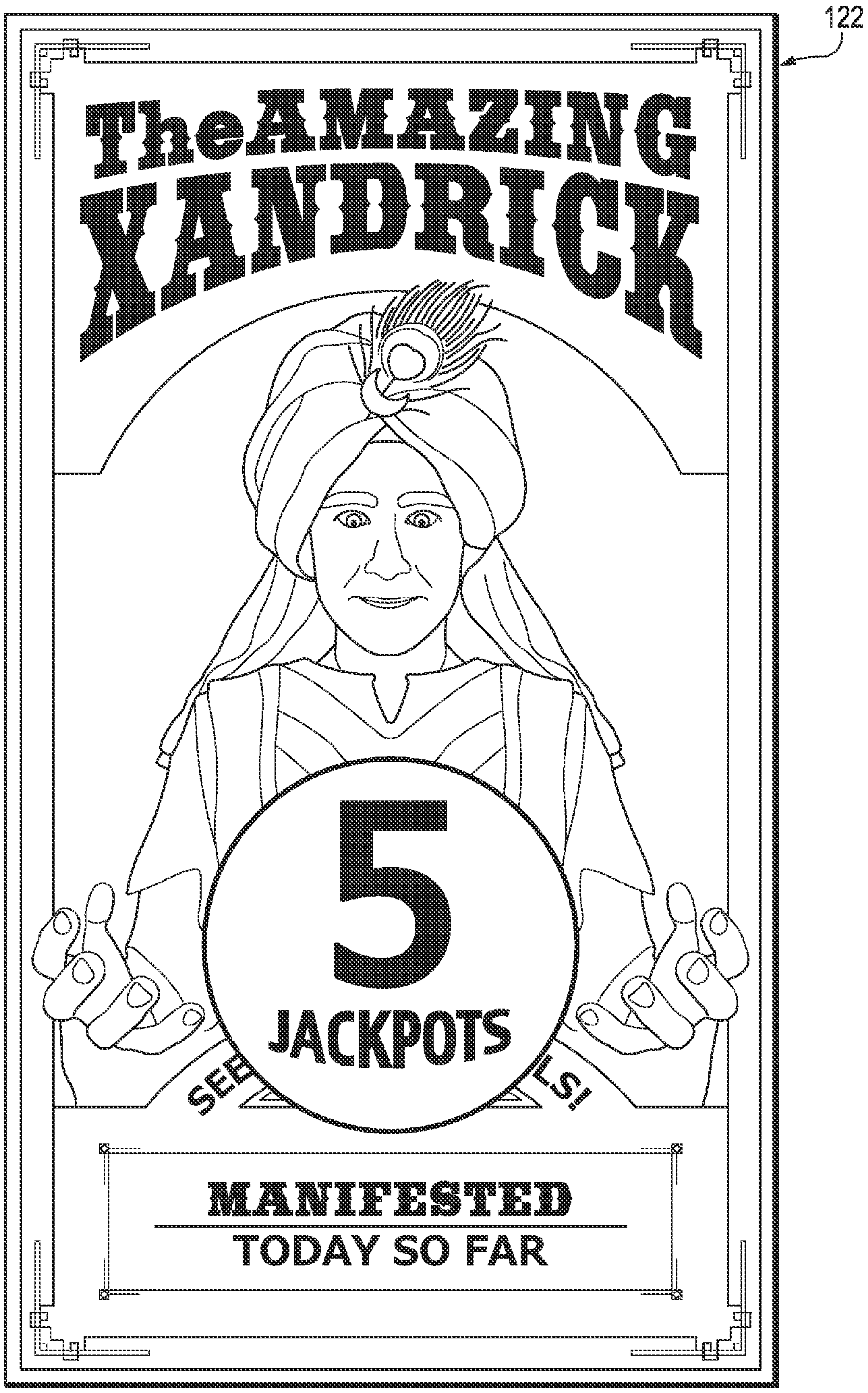

After the image in FIG. 15, Xandrick returns to the state shown in FIG. 14. Next, light begins to radiate from the pin at the center of his turban as shown in FIG. 16. This presages a prediction of the total number of significant jackpots casino wide in FIG. 17. In the present embodiment, this corresponds to the number of jackpots for which Madame Fortuna predicted the amount in FIG. 9. Next, in FIG. 18, Xandrick indicates how many jackpots of those predicted in FIG. 17 have thus far occurred. This number corresponds to the number of jackpots that produced Madame Fortuna's cumulative amount awarded in FIG. 10.

Like Madame Fortuna, Xandrick is generated using the Adobe Flash™ platform, so he can be made to behave in any fashion. As with Madame Fortuna, any combination of photographic or video images and computer-generated images can be used with any type of suitable system for generating animations to appear on Video Display 122.

Figure 19:
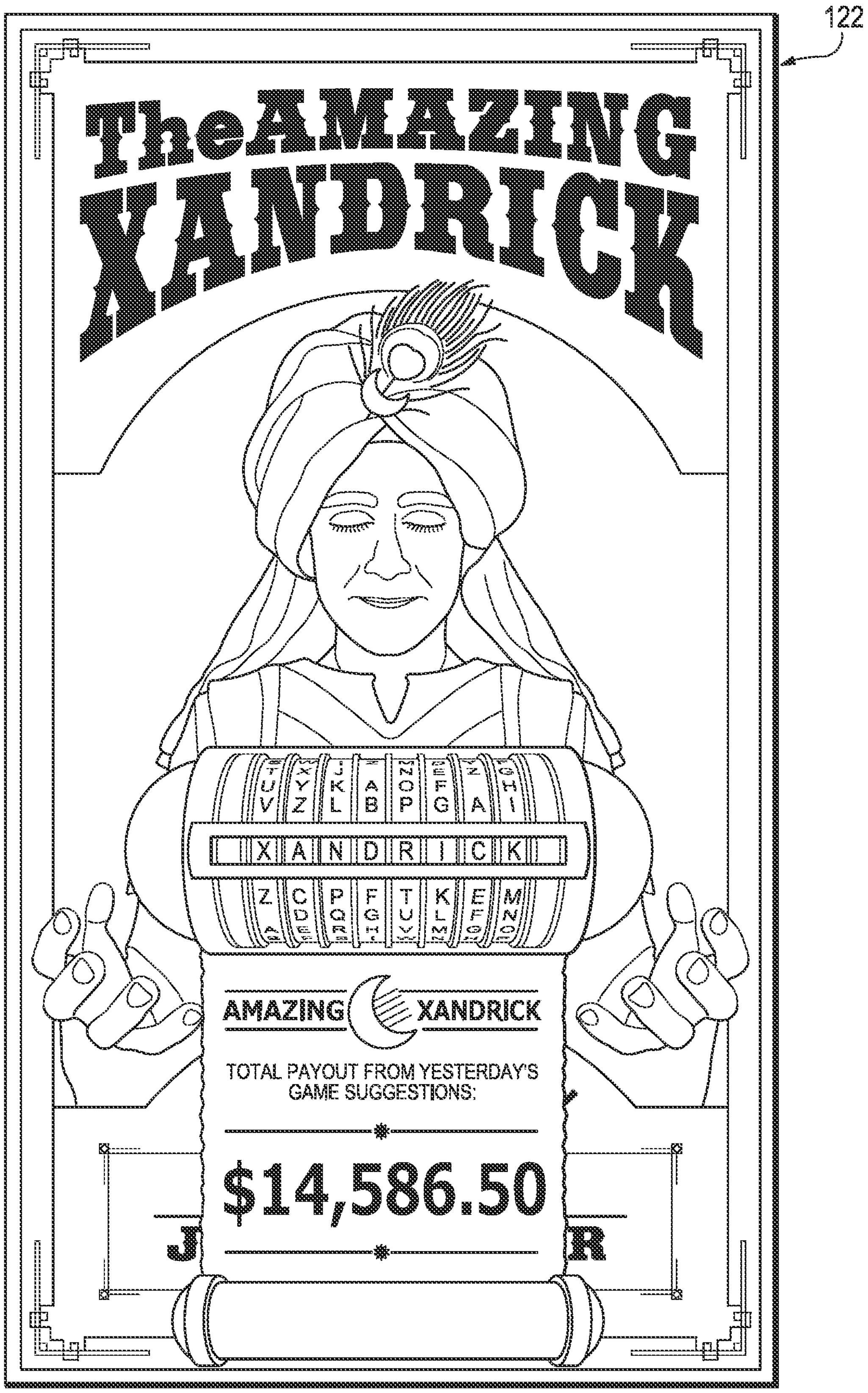

FIG. 19 shows the total amount of dollars paid yesterday on the machines recommended (as in FIG. 15) yesterday. In FIG. 19, the cryptex appears, and the scroll with the writing shown in FIG. 19 lowers down, revealing the results of yesterday's suggested games.

Figure 20:
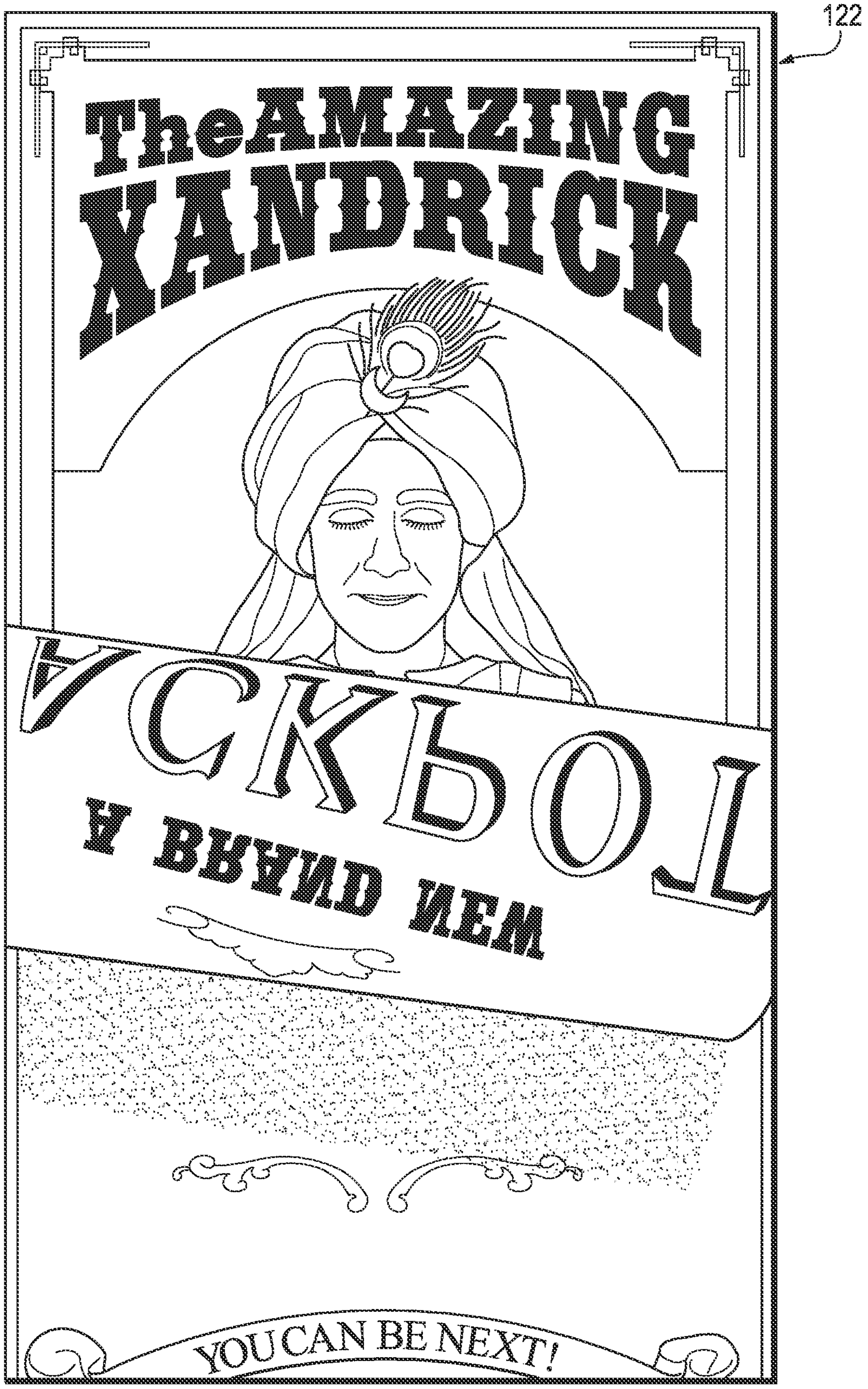

FIG. 20 corresponds to Madame Fortuna in FIG. 12 when a significant jackpot occurs, substantially in real time, anywhere in the casino. A paper poster starts rolling up over the display to cover Xandrick as shown in FIG. 20. Reversed words that appear on the front of the poster are visible in FIG. 20. Although not shown for Xandrick, the scroll ultimately unrolls to cover the entire display screen as in FIG. 13. All displays in the casino are coordinated to celebrate the occurrence of a significant jackpot substantially simultaneously on each display. After the brief jackpot celebration, the scroll disappears and the display resumes displays as shown in FIGS. 14-19.

Figure 21:
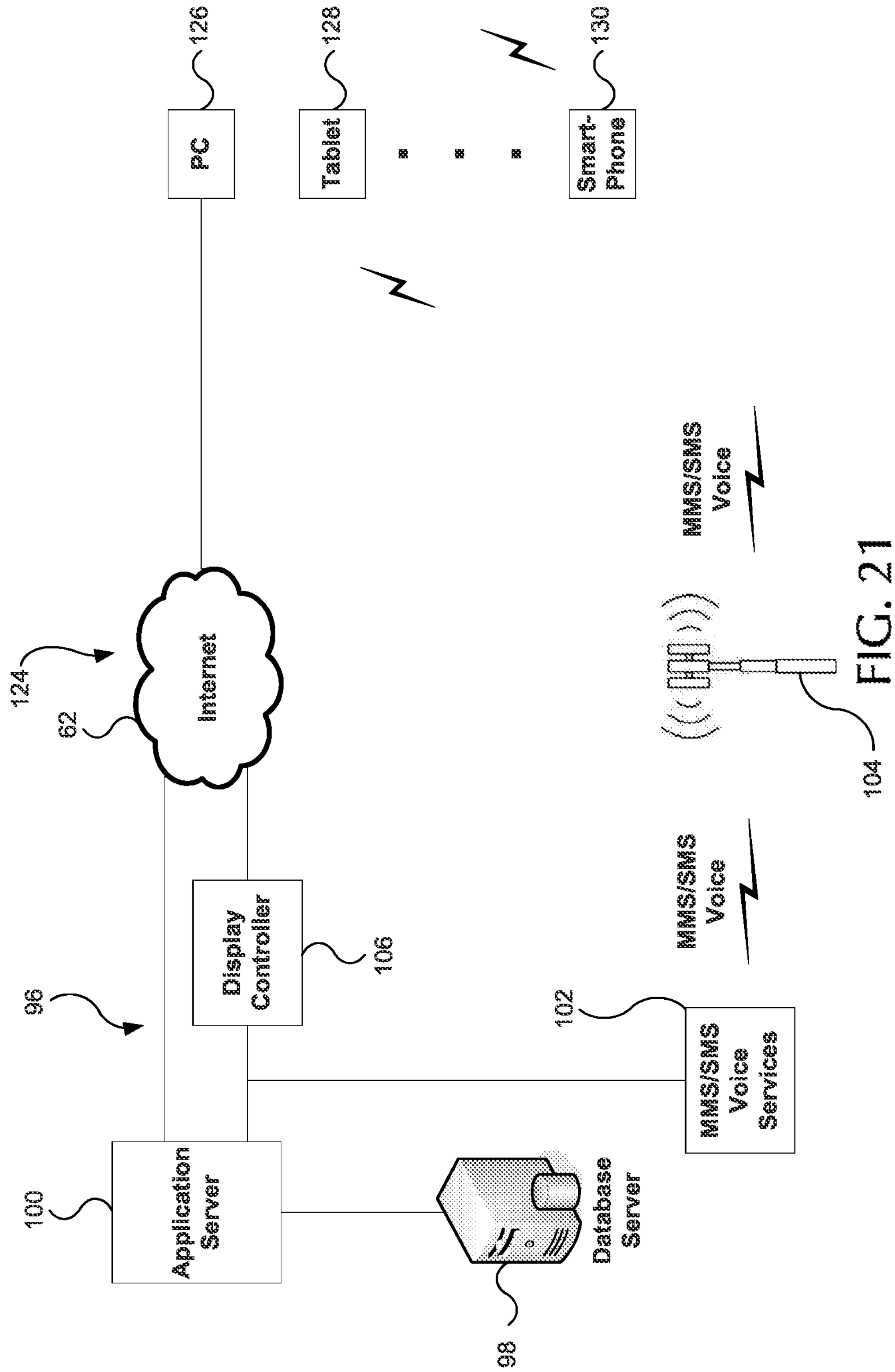
FIG. 21 is a schematic diagram illustrating an alternate embodiment.

Finally, FIG. 21 illustrates an alternative embodiment, which is indicated generally at 124. Structure that generally corresponds to that previously identified in system 92 in FIG. 4 retains the same numeral. As will be seen, system 124 includes additional functionality that for the most part may be implemented via software accessible by the system. FIG. 21 depicts a system that may be used to implement Internet gaming, although the same offsite portion 96 could be used to simultaneously operate both casino and Internet gaming.

In addition to the structure described in FIG. 4, system 124 includes a plurality of gaming devices 126, 128, 130, connected to the Internet 62. Such devices may also include, e.g., a video gaming device like the Xbox™ device made by Microsoft. They may be connected from homes, commercial establishments, or any place that the computing devices could operate. These gaming devices can comprise many different kinds of computing devices. For example, gaming device 126 is a personal computer, gaming device 128 is a tablet computer, and gaming device 130 is a smartphone. Smartphone 130 could be connected to Internet 62 via a wireless or cellular connection, e.g., via a signal from antenna 104.

Games may be implemented on any of these devices via a dedicated application. Alternatively, game software may be provided on server 100, which executes and runs the software thereon. In such cases, the software generates a game interface on the computing devices with which a player interacts, typically via a web browser. Wagering may be effected via deposit accounts opened using the computing device and interacting with application server 100. In this implementation, all information or recommendations discussed herein may be delivered to gaming devices 126, 128, 130 via the Internet wherever the player may be.

As with Madame Fortuna, different aspects may be repeated rather than sequentially advancing as described herein. For example, there might be a sequence in which several different games in a row are recommended. Or the recommendations might be interspersed with displays of results and predictions. Any combination of these displays may be equally effective.

As mentioned above, the present embodiment includes 4 displays, each associated with 4 different sections of the networked slot machines and with a corresponding floor area in the casino. Two of the displays depict Madame Fortuna and two depict Xandrick. Both Madame Fortuna displays recommend cold machines contained within the respective floor area associated with each display. This means that the Madame Fortuna recommendation displays, one of which is depicted in FIGS. 7, recommends different games, and the results displays, one of which is depicted in FIG. 11, will contain different dollar amounts from one another because each is recommending and depicting the results of prior recommendations within the respective areas associated with each display. But because the jackpot forecast and current status in FIGS. 9 and 10 are casino wide, the numbers in both displays featuring Madame Fortuna will be the same for those images.

Similarly the two Xandrick displays will produce different numbers in 15 and 19 for the same reasons. And the numbers in FIGS. 17 and 18 will be the same because they are casino wide.

Xandrick's audio-visual personality is focused, cold, and calculating. He reflects the mindset of players who consider themselves serious gamblers who think long-term and who are not satisfied with nickel and dime wins. They risk more because the payoff is bigger. A cold machine is merely a work in progress, and a loss simply means that the player is one step closer to the ultimate achievement.

It should be appreciated that many more virtual personae could be implemented in a manner similar to that described for Madame Fortuna and Xandrick. In addition to presenting a virtual persona via displays, like displays 114, 122 in casino 94, the same video signal used to generate those displays could be provided to patron's web browser 118, which can be mobile or accessed via a web browser on a desktop computer or by an application dedicated to presenting a virtual persona on the user's smartphone or mobile or desktop computing device. As a result, a player remote from the casino can be informed about jackpots predicted, current number and amount of significant jackpots, and recommended games.

In addition, a public website or Facebook™ page could include recommendations, predictions, and status information. Alternatively, such a website or page could be secure with access provided via password only to select players or potential players, e.g., those enrolled in the casino's player-tracking system.

As referred to above, casino could naturally have different (or the same) characters or the same characters but utilizing different audio-visual presentations. And of course each set of forecasts and results will be specific to the casino in which the character is displayed.

In one aspect, the personae can communicate with enrolled players, or players who have otherwise provided contact information, who are not currently in the casino. For example, the hot and cold machine information could be provided to players not currently in the casino via text, email, dialog box, or otherwise. Similarly, characters could offer incentives to such players to come to the casino—or to initiate online gaming, if permissible—when casino traffic is low or whenever the casino operator wishes to encourage such players to gamble.

In addition to information and recommendations about gaming machines, the present system can offer information and recommendations about other types of services. For example, the customer could seek advice about which casino at which to play, which restaurant at which to eat, and which shows to see. He or she could even ask about a particular meal to eat to increase his or her luck. And the system could compile information about goods and services recommended as it does with gaming machines. This information, such as level of attendance or revenues generated at specific venues, could be used at least in part to make a recommendation.

In addition, players can communicate with one or more selected characters to obtain a "reading." This can be done via text messaging, e.g., SMS/MMS, email, Twitter™, instant messaging. Such messaging can be generated by using known computer technology to receive communications and prepare responses based on key words and structure of the communication. Voice recognition may be used in the course of preparing a response to a spoken communication.

In this manner, the system can text to a cell phone or email address information about personal recommendations, casino rewards (buffets, tickets, player points, etc.), or specific promotions. Such text conversations may be initiated via reading a QR code via a smartphone or other device, sign up, or other method. An example text interaction comprises:

Patron texts "AMAZING" to a short code number (programmed for Xandrick), as follows:

Patron: AMAZING

Xandrick: The Amazing Xandrick at your service! I see Jackpots! "Twice Your Monkey" is past due for a payout, Machine 789!

Alternatively, the patron receives a reward, as follows:

Xandrick: Claim your reward at Casino Del Sol. You have won a free buffet!

Patron texts "RICHES" to a short code number (programmed for Madame Fortuna), as follows:

Patron: RICHES

Fortuna: Madame Fortuna here, your free fortune reading reveals riches are currently paying at Lobstermania 2, Machine 234!

Alternatively, the patron receives free play, as follows:

Fortuna: Fortuna predicts riches on the rise! See Casino Club with offer code Qz32 to claim your free play!

The system as described above, and its alternatives, may be used to make recommendations that are not tied to any statistical analysis nor are based on any historical play information. For example, one of the personae, e.g., Madame Fortuna, could make a recommendation to play a game that is "based upon today's weather," or based upon the player's "horoscope" or their "aura." Such recommendations could be literally based on anything: a stock market, lucky lottery picks, outcomes of sports events, etc. These recommendations may also include time to play, e.g., month, day, hour, days of week. And they could recommend where to play, e.g., casino or area within a casino.

A patron might be given a recommendation that is not based on analysis or historical play as described above, but that is also not delivered by personae. For example, the player might receive a text, automated or otherwise, over system 92 that simply says: "Your lucky machine is 1542."

And of course this message might be delivered by a persona in any of the ways described above—or even by a real person or an image and/or sound of a real person.

As noted above, the player can be presented with the 10 hottest or coldest machines in order, or ranked by another parameter such as total awards, highest as a percentage of total wagers, etc. This could be done for any time period—hour, day, week, month, etc. In this case, no recommendation is given, just information.

On the other hand, essentially no information could be provided in the context of a straight recommendation, i.e., as just mentioned: "Your lucky machine is 1542." This recommendation may be made without any kind of persona delivering it as with a text message.

Beyond that is a recommendation delivered by a virtual persona as described above. Even beyond that is a recommendation delivered by a live person, e.g., a casino employee or agent. This live recommendation could be based on any of the data and analysis discussed above, or—as also mentioned above—it need not have any basis.

Recommendations can be based upon historical game play (gathered by connecting to the system as described above), events within the casino (busy, not busy, special promotions, game payback % recently changed, progressive jackpot is exceptionally low or high, etc.), events outside the casino (day of week, time, date such as holiday, etc. presidential election, sports team match ups or scores, etc.), personal information about the player (past success, birthday, age, birth month, horoscope, palm reading, etc.), and personal info about the recommender (virtual characters can have personalities, birth dates, anniversaries, etc., as do real characters who make recommendations).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

What is claimed is:

1. A method comprising:

receiving, by a computing device, gambling data associated with one or more gaming machines and player data associated with at least one player;

determining, based on the gambling data, one or more hold variances associated with the one or more gaming machines;

determining, based on the one or more hold variances associated with the one or more gaming machines and the player data associated with the at least one player, one or more attract effects associated with the one or more gaming machines; and outputting, via the one or more gaming machines, the one or more attract effects.

2. The method of claim 1, wherein the gambling data associated with the one or more gaming machines comprises one or more of: coin in data, coin out data, a jackpot number, one or more jackpot values, or combinations thereof.

3. The method of claim 1, wherein the player data comprises a player profile, one or more player characteristics, one or more risk profiles, one or more account values, one or more loyalty program identifiers, or combinations thereof.

4. The method of claim 1, wherein determining the one or more hold variances comprises determining a difference between a theoretical hold and an actual hold of the one or more gaming machines.

5. The method of claim 1, further comprising determining one or more recommendation categories by ranking the one or more gaming machines according to an amount held relative to a configured hold amount.

6. The method of claim 1, wherein outputting the one or attract effects comprises displaying, via a display device associated with the one or more gaming machines, one or more personas, one or more visual effects, one or more audio effects, or a recommendation category of one or more recommendation categories.

7. The method of claim 1, further comprising:

determining a player identifier;

determining, based on the player identifier, a risk profile associated with the player identifier; and updating, based on the risk profile associated with the player identifier, one or more recommendation categories associated with the one or more gaming machines.

8. A system comprising:

a computing device configured to:

receive gambling data associated with one or more gaming machines and player data associated with at least one player;

determine, based on the gambling data, one or more hold variances associated with the one or more gaming machines;

determine, based on the one or more hold variances associated with the one or more gaming machines and the player data associated with the at least one player, one or more attract effects associated with the one or more gaming machines; and a display device configured to:

output, via the one or more gaming machines, the one or more attract effects.

9. The system of claim 8, wherein the gambling data associated with the one or more gaming machines comprises one or more of: coin in data, coin out data, a jackpot number, one or more jackpot values, or combinations thereof.

10. The system of claim 8, wherein the player data comprises a player profile, one or more player characteristics, one or more risk profiles, one or more account values, one or more loyalty program identifiers, or combinations thereof.

11. The system of claim 8, wherein the computing device is configured to determine the one or more hold variances by determining a difference between a theoretical hold and an actual hold of the one or more gaming machines.

12. The system of claim 8, wherein the computing device is further configured to determine one or more recommendation categories by ranking the one or more gaming machines according to an amount held relative to a configured hold amount.

13. The system of claim 8, wherein the one or more attract effects comprise one or more of: one or more personas, one or more lighting effects, or one or more audio effects.

14. The system of claim 8, wherein the computing device is further configured to:

determine a player identifier;

determine, based on the player identifier, a risk profile associated with the player identifier; and update, based on the risk profile associated with the player identifier, one or more recommendation categories associated with the one or more gaming machines.

15. An apparatus comprising:

one or more processors; and a memory storing processor-executable instructions that, when executed by the one or more processors, cause the apparatus to:

receive gambling data associated with one or more gaming machines and player data associated with at least one player;

determine, based on the gambling data, one or more hold variances associated with the one or more gaming machines;

determine, based on the one or more hold variances associated with the one or more gaming machines and the player data associated with the at least one player, one or more attract effects associated with the one or more gaming machines; and output, via the one or more gaming machines, the one or more attract effects.

16. The apparatus of claim 15, wherein the gambling data associated with the one or more gaming machines comprises one or more of: coin in data, coin out data, a jackpot number, one or more jackpot values, or combinations thereof.

17. The apparatus of claim 15, wherein the player data comprises a player profile, one or more player characteristics, one or more risk profiles, one or more account values, one or more loyalty program identifiers, or combinations thereof.

18. The apparatus of claim 15, wherein the processor-executable instructions, when executed by the one or more processors, further cause the apparatus to determine a difference between a theoretical hold and an actual hold of the one or more gaming machines.

19. The apparatus of claim 15, wherein the processor-executable instructions, when executed by the one or more processors, further cause the apparatus to rank the one or more gaming machines according to an amount held relative to a configured hold amount.

20. The apparatus of claim 15, wherein the processor-executable instructions, when executed by the one or more processors, further cause the apparatus to:

determine a player identifier;

determine, based on the player identifier, a risk profile associated with the player identifier; and update, based on the risk profile associated with the player identifier, one or more recommendation categories associated with the one or more gaming machines.

* * * * *